(12) United States Patent
Siband et al.

(10) Patent No.: US 11,680,123 B2
(45) Date of Patent: Jun. 20, 2023

(54) RADIATION CURABLE COMPOSITION

(71) Applicant: ALLNEX BELGIUM S.A., Drogenbos (BE)

(72) Inventors: Elodie Siband, Brussels (BE); Stephan Peeters, Heverlee (BE); Steven Cappelle, Ninove (BE)

(73) Assignee: ALLNEX BELGIUM S.A., Drogenbos (BE)

(*) Notice: Subject to any disclaimer, the term of this patent is extended or adjusted under 35 U.S.C. 154(b) by 386 days.

(21) Appl. No.: 16/763,291

(22) PCT Filed: Nov. 22, 2018

(86) PCT No.: PCT/EP2018/082239
§ 371 (c)(1),
(2) Date: May 12, 2020

(87) PCT Pub. No.: WO2019/101865
PCT Pub. Date: May 31, 2019

(65) Prior Publication Data
US 2020/0299449 A1 Sep. 24, 2020

(30) Foreign Application Priority Data

Nov. 23, 2017 (EP) .................................... 17203388

(51) Int. Cl.
| | | |
|---|---|---|
| C08F 220/20 | (2006.01) | |
| C08G 18/22 | (2006.01) | |
| C08G 18/24 | (2006.01) | |
| C08G 18/62 | (2006.01) | |
| C08G 18/67 | (2006.01) | |
| C08G 18/73 | (2006.01) | |
| C08G 18/75 | (2006.01) | |
| C08G 18/79 | (2006.01) | |
| C09D 11/102 | (2014.01) | |
| C09D 133/06 | (2006.01) | |
| C09D 133/14 | (2006.01) | |
| C09D 175/16 | (2006.01) | |
| C09J 133/06 | (2006.01) | |
| C09J 133/14 | (2006.01) | |

(52) U.S. Cl.
CPC .......... *C08F 220/20* (2013.01); *C08G 18/227* (2013.01); *C08G 18/246* (2013.01); *C08G 18/6258* (2013.01); *C08G 18/673* (2013.01); *C08G 18/73* (2013.01); *C08G 18/755* (2013.01); *C08G 18/792* (2013.01); *C09D 11/102* (2013.01); *C09D 133/066* (2013.01); *C09D 133/14* (2013.01); *C09D 175/16* (2013.01); *C09J 133/066* (2013.01); *C09J 133/14* (2013.01)

(58) Field of Classification Search
CPC ... C09J 133/14; C09J 133/066; C09D 175/16; C09D 133/14; C09D 133/066; C09D 11/102; C08G 18/792; C08G 18/155; C08G 18/73; C08G 18/673; C08G 18/246; C08G 18/227; C08F 220/20
See application file for complete search history.

(56) References Cited

U.S. PATENT DOCUMENTS

| | | | |
|---|---|---|---|
| 9,169,381 B2 * | 10/2015 | Tielemans | ............ C08L 33/14 |
| 2009/0269568 A1 | 10/2009 | Kuhlmann et al. | |
| 2010/0249263 A1 | 9/2010 | Huynh-Ba | |
| 2013/0122310 A1 | 5/2013 | Tielemans et al. | |

FOREIGN PATENT DOCUMENTS

| | | |
|---|---|---|
| EP | 2 231 796 | 9/2010 |
| WO | 2009/086285 | 7/2009 |

OTHER PUBLICATIONS

International Search Report (ISR) dated Jan. 25, 2019 in International (PCT) Application No. PCT/EP2018/082239.

* cited by examiner

*Primary Examiner* — Sanza L. McClendon
(74) *Attorney, Agent, or Firm* — Wenderoth, Lind & Ponack, L.L.P.

(57) ABSTRACT

The present invention generally relates to the field of radiation curable compositions comprising (meth)acrylated acrylic polymers comprising pendant hydroxyl groups, methods for making these radiation curable compositions and their uses.

15 Claims, No Drawings

RADIATION CURABLE COMPOSITION

TECHNICAL FIELD

The present invention generally relates to the field of radiation curable compositions comprising (meth)acrylated acrylic polymers comprising pendant hydroxyl groups, methods for making these radiation curable compositions and their uses.

BACKGROUND ART

Acrylic polymers have been used as the main backbone for the development of radiation curable polymer compositions with specific properties. The acrylic polymer is often preferred when coatings need to be produced with good optical properties, good adhesion or superior outdoor resistance.

However, the polymer does not contain the ethylenically unsaturated functionality and does not consequently participate to the crosslinking network after radiation curing, resulting in a pronounced reduction of the chemical and mechanical resistance properties as well as additional safety, health and environmental concerns.

To provide the best performance, it is more desirable to covalently attach ethylenically unsaturated functionalities directly to the acrylic polymer.

The acrylation of the (meth)acrylated acrylic polymers may be implemented via different grafting chemistries including for instance the reaction between carboxylic acid and epoxy, between hydroxyl and N-methylol, between anhydride and hydroxyl or between carboxylic acid and hydroxyl.

(Meth)acrylated acrylic polymers which further comprise pendant hydroxyl groups may be of interest in dual cure systems which are often used for preparing post-formable films or conformal coatings as well.

Generally, the (meth)acrylated acrylic polymers comprising pendant hydroxyl groups are obtained by reacting an epoxy compound like glycidyl methacrylate (GMA) with an acrylic acid. This reaction allows obtaining covalently attached ethylenically unsaturated functionalities directly to the acrylic polymer.

However, GMA is a hazardous compound and is now classified as a CMR (carcinogenic, mutagenic, reprotoxic) substance. This means that GMA might affect the human health and the environment. Furthermore, since the acrylation is done with only mono(meth)acrylate compounds, this is not possible to prepare a broad range of different (meth)acrylated acrylic polymers comprising pendant hydroxyl groups. It has to be underlined than when using GMA to introduce (meth)acrylate group and hydroxyl groups in the acrylic polymer backbone, the number of (meth)acrylate group is proportional to the number of OH groups introduced. In addition, the (meth)acrylate groups and the hydroxyl groups are linked to the same (meth)acrylate compound, thus both groups are close to each other in the resulting polymers. This may impact the reactivity of the polymer since the hydroxyl group and the (meth)acrylate group are sterically hindered and thus cannot both react. As a result, it is also difficult to fine-tune the reactivity of the resulting polymers depending on the desired use.

US20130122310 discloses an aqueous radiation curable composition comprising at least one ethylenically unsaturated polymer, a water dispersible (meth)acrylic polymer and at least one ethylenically unsaturated compound which can be radically polymerized under irradiation and which attaches to (meth)acrylic polymer by a urethane linkage. However, this kind of aqueous radiation curable composition is not suitable for all radiation curable applications.

EP2231796 refers to a coating composition comprising a component A comprising one or more acrylic polymers having one or more chemically crosslinkable functional groups X, a component B comprising one or more monomers or oligomers having one or more functional groups Y which react with functional groups X to form a crosslink and one or more radiation crosslinkable functional groups D. Functional groups X and Y are pair wise selected from hydroxyl and isocyanate groups, thiol and isocyanate groups, epoxy and acid groups, epoxy and isocyanate groups, isocyanate and amine groups or isocyanate and urethane groups. However, this coating composition is not tack free before being cured.

Thus, there is a need to develop (meth)acrylated acrylic polymers comprising pendant hydroxyl groups which are GMA free and which can be produced with a broad range of different hydroxy functional (meth)acrylate monomers in order to obtain various properties suitable for numerous radiation curable applications.

Technical Problem

The present invention aims to provide radiation curable compositions comprising (meth)acrylated acrylic polymers comprising pendant hydroxyl groups which are GMA free and which can be fine-tuned depending on the aimed coating properties. In addition, the other required properties for radiation curable applications, in particular dual cure application, for instance a low tackiness, are not affected.

General Description of the Invention

In order to overcome the above-mentioned technical problem, the present invention provides:

A radiation curable composition (X) comprising at least one (meth)acrylated acrylic polymer (AA) comprising pendant hydroxyl (OH) groups which is the reaction product of:

a. At least one water-insoluble (meth)acrylic polymer (AP) comprising pendant hydroxyl groups which is the reaction product of:
  a1) at least one hydroxy functional ethylenically unsaturated monomer (AP1), and
  a2) at least one ethylenically unsaturated monomer (AP2) which is different from (AP1), and
b. At least one isocyanate (NCO) group-containing monoadduct (MA) comprising at least one (meth)acrylate group and which attaches to the water-insoluble (meth)acrylic polymer (AP) comprising pendant hydroxyl groups by an urethane linkage and which is the reaction product of:
  b1) at least one polyisocyanate (MA1), and
  b2) at least one hydroxy functional (meth)acrylate monomer (MA2), and wherein the equivalent ratio of NCO groups to OH groups of the radiation curable composition (X) is from 1:0.5 to 1:10 and the glass transition temperature (Tg) of the radiation curable composition (X) after the acrylation is at least 10° C. According to one embodiment, the glass transition temperature (Tg) is measured by dynamic scanning calorimetry (DSC) according to the standard ASTM E1356-08.

Indeed, the radiation curable composition (X) comprising at least one (meth)acrylated acrylic polymer (AA) comprising pendant hydroxyl groups is free of GMA. In addition, a broad range of different hydroxy (meth)acrylate monomers may be used in order to introduce the (meth)acrylate groups in the acrylic backbone of the (meth)acrylated acrylic polymer (AA) comprising pendant hydroxyl groups. As a result, numerous and various combinations of hydroxy functional (meth)acrylate monomers with other monomers may be used. This allows fine tuning the properties of the resulting (meth)acrylated acrylic polymer (AA) comprising pendant hydroxyl groups.

According to the invention, the term "acrylation" refers to the grafting of the (meth)acrylate groups which occurs via an urethanization step. It means that at least one NCO group of the isocyanate group-containing monoadduct (MA) comprising at least one (meth)acrylate group reacts with at least one hydroxyl group of the at least one water-insoluble (meth)acrylic polymer (AP) comprising pendant hydroxyl groups in order to form an urethane linkage. Thus, the (meth)acrylate groups are covalently attached to the backbone of the (meth)acrylated acrylic polymer (AA) comprising pendant hydroxyl groups without using GMA.

The resulting radiation curable composition (X) is water-insoluble and comprises an amount of free pendant hydroxyl groups which is suitable for specific dual cure applications like thermoforming. The radiation curable composition (X), before curing, also shows satisfying properties like low tackiness or preferably no tackiness at room temperature, which is particularly desirable for some specific dual cure applications like thermoforming. According to one embodiment, the radiation curable composition (X) is not tacky or is tack-free before curing at room temperature. After curing, the resulting coating is also tack-free.

In the context of the present invention, "tacky" means visible marks appear on the surface when the surface of a dried film is touched with an object. "Tack free" or "dry-to-touch" or "dry coating" means no visible marks appear on the surface when this one is touched with an object such as finger.

Another aspect of the invention is a radiation curable composition (Y) comprising:

At least one radiation curable composition (X), and
At least one polyisocyanate compound (P1), wherein the ratio between the NCO groups and the OH groups of the radiation curable composition (Y) is from 0.7:1 to 1.15:1.

Another aspect of the invention is a process for preparing the radiation curable composition (X) which comprises the steps of:
Step 1: Reacting the at least one hydroxy functional ethylenically unsaturated monomer (AP1) with the at least one ethylenically unsaturated monomer (AP2) which is different from (AP1) in order to obtain at least one water-insoluble (meth)acrylicpolymer (AP) comprising pendant hydroxyl groups, and
Step 2: Conducting an urethanization step by admixing the resulting at least one water-insoluble (meth)acrylic polymer (AP) comprising pendant hydroxyl groups:
  with at least one NCO group-containing monoadduct (MA) comprising at least one (meth)acrylate group,
  Or with at least one polyisocyanate (MA1) and at least one hydroxy functional (meth)acrylate monomer (MA2), the NCO group-containing monoadduct (MA) comprising at least one (meth)acrylate group being formed in situ.

Another aspect of the invention is an article coated with a radiation curable composition (X) or (Y).

Another aspect of this invention is a method for coating which comprises the steps of:

Step 1: Applying the radiation curable composition (X) or (Y) to at least one surface of a substrate and
Step 2: Curing the radiation curable composition (X) or (Y) by submitting the coated substrate to the radiation and/or to the heat. When both radiation and heat are used for the curing, they can be performed in any order.

Another aspect of the invention is the use of the radiation curable composition (X) or the radiation curable composition (Y) for dual cure application, for instance for preparing post-formable films, for conformal coating, for composites, for three dimensional (3D) applications, for thick pigmented systems where the light cannot penetrate deep enough (deep curing), or as an adhesion promoter. In particular, the radiation curable composition (X) or the radiation curable composition (Y) may be used in various areas like automotive, cosmetic packaging, furniture, and the like.

DESCRIPTION OF PREFERRED EMBODIMENTS

The present invention proposes a radiation curable composition (X) comprising at least one (meth)acrylated acrylic polymer (AA) comprising pendant hydroxyl groups which is the reaction product of:
a) At least one water-insoluble (meth)acrylic polymer (AP) comprising pendant hydroxyl groups which is the reaction product of:
  a1) at least one hydroxy functional ethylenically unsaturated monomer (AP1), and
  a2) at least one ethylenically unsaturated monomer (AP2) which is different from (AP1), and
b) At least one isocyanate group-containing monoadduct (MA) comprising at least one (meth)acrylate group and which attaches to the water-insoluble (meth)acrylicpolymer (AP) comprising pendant hydroxyl groups by an urethane linkage and which is the reaction product of:
  b1) at least one polyisocyanate (MA1), and
  b2) at least one hydroxy functional (meth)acrylate monomer (MA2),
and wherein the equivalent ratio of NCO groups to OH groups of the radiation curable composition (X) is from 1:0.5 to 1:10 and the Tg of the radiation curable composition (X) after the acrylation is at least 10° C.

The term "radiation curable composition" stands for a composition which can be cured under exposition to radiation.

The term "OH" means hydroxyl. Both terms may be used interchangeably throughout the text.

The term "NCO" means isocyanate. Both terms may be used interchangeably throughout the text.

The term "acrylic polymer" refers to all the polymers obtained from radical polymerization of (meth)acrylate monomers or copolymers including (meth)acrylate and vinylic monomers. The term "acrylic polymer" also encompasses "methacrylic polymer". The term "(meth)acrylate" as used herein is meant to encompass both acrylate and methacrylate compounds, that are compounds that comprise at least one acrylate ($CH_2$=CHCOO—) and/or methacrylate ($CH_2$=$CCH_3$COO—) group. The term "vinylic" refers to compounds comprising at least one vinyl ($CH_2$=CH—) group.

The term "(meth)acrylated acrylic polymer" refers to an acrylic polymer comprising at least one (meth)acrylate function that is able to be cured under exposition to radiation.

The term "monoadduct" (MA) refers to a reaction product of at least one polyisocyanate (MA1) and at least one hydroxy functional (meth)acrylate monomer which comprises at least one (meth)acrylate group (MA2). The monoadduct can be prepared in situ, which means that the required reactants for preparing the monoadduct (MA) are admixed simultaneously with the water-insoluble (meth) acrylic polymer (AP) comprising pendant hydroxyl groups in the reactor.

By an "ethylenically unsaturated compound" is meant a compound having at least one ethylenically unsaturated functionality which can undergo radical polymerization. By "ethylenically unsaturated functionalities" is meant to designate groups with one or more carbon-carbon double bond which under the influence of irradiation and/or a (photo) initiator can undergo radical polymerization. The polymerizable ethylenically unsaturated functionalities are generally chosen from allyl groups, vinyl groups and/or from (meth) acryloyl groups, though double bonds may come also from unsaturated acids, unsaturated fatty acids, acrylamides etc. Preferred are often "(meth)acrylated compounds", meaning compounds having one or more (meth)acryloyl groups. In the present invention, the term "(meth)acryl" is to be understood as to encompass both "acryl*" and "methacryl*" compounds or derivatives as well as mixtures thereof. "Acryl*" groups are generally preferred.

The radiation curable composition (X) comprises, consists essentially of or consists of the (meth)acrylated acrylic polymer (AA) comprising pendant hydroxyl groups.

The radiation curable composition (X) is a non-aqueous composition. The radiation curable composition (X) and in particular the (meth)acrylated acrylic polymer (AA) comprising pendant hydroxyl groups is free of GMA. The radiation curable composition (X) shows a low tackiness or preferably is tack-free at room temperature before being cured. The radiation curable composition (X) is water-insoluble.

The radiation curable composition (X) comprising at least one (meth)acrylated acrylic polymer (AA) comprising pendant hydroxyl groups shows a Tg after the acrylation of at least 10° C. The glass transition temperature (Tg) designates the range of temperatures over the glass transition occurs, namely the transition from a hard state into a viscous state. The Tg of a polymer might be a good indicator of the tackiness of this polymer. The radiation curable composition (X) shows a low tackiness or preferably is tack-free before being cured. According to one embodiment, the Tg of the radiation curable composition (X) is at least 10° C., preferably at least 12° C., more preferably at least 15° C. and most preferably at least 17° C. According to one embodiment of the invention, the Tg of the radiation curable composition (X) does not exceed 90° C., preferably is at most 80° C., more preferably is at most 70° C. and most preferably is at most 50° C. According to a specific embodiment, the range of values of the Tg is from 10° C. to 90° C., preferably from 12° C. to 60° C., more preferably from 15° C. to 50° C. and most preferably from 17° C. to 45° C.

In the context of the present invention, the equivalent ratio refers to the ratio of NCO groups to OH groups for obtaining the radiation curable composition (X) comprising the (meth) acrylated acrylic polymer (AA) comprising pendant hydroxyl groups. It means that the amounts of the water-insoluble (meth)acrylic polymer (AP) comprising pendant hydroxyl groups and the isocyanate group-containing monoadduct (MA) comprising at least one (meth)acrylate group are selected to provide an equivalent ratio of NCO groups to OH groups which is comprised from 1:0.5 to 1:10, preferably from 1:1 to 1:7 and more preferably from 1:1.5 to 1:4. Typically, the equivalent ratio of NCO groups to OH groups stands for the ratio of the amount of substance of NCO groups in equivalent and the amount of substance of OH groups in equivalent normalized on one for the NCO group.

The (meth)acrylated acrylic polymer (AA) comprising pendant hydroxyl groups is obtained via an urethanization step between the water-insoluble (meth)acrylic polymer (AP) comprising pendant hydroxyl groups and the isocyanate group-containing monoadduct (MA) comprising at least one (meth)acrylate group. The urethanization step is in fact conducted under conditions in order to obtain a (meth) acrylated acrylic polymer (AA) comprising pendant hydroxyl groups. The term "pendant hydroxyl groups" refers to the hydroxyl groups remaining in the (meth) acrylated acrylic polymer (AA) comprising pendant hydroxyl groups obtained which have not reacted with NCO groups in order to form an urethane linkage. The (meth) acrylated acrylic polymer (AA) comprising pendant hydroxyl groups is thus substantially free of NCO groups. Accordingly, the radiation curable composition (X) is also substantially free of NCO groups. According to one embodiment, the amount of the NCO groups in the composition (X) is at most 0.015 meq/g.

The (meth)acrylated acrylic polymer (AA) comprising pendant hydroxyl groups has at least one free pendant hydroxyl group. Preferably, the (meth)acrylated acrylic polymer (AA) comprising pendant hydroxyl groups shows several free pendant hydroxyl groups. The pendant hydroxyl groups may react during the curing of the radiation curable composition (X) for instance with further NCO groups containing compounds such as polyisocyanates or NCO groups containing urethane (meth)acrylates. This can be the case in particular when the radiation curable composition (X) is used in two components (2K) compositions, like radiation curable compositions (Y). Usually, a two components (2K) composition contains a first component having both radiation curable groups, such as acrylate double bonds, and chemical crosslinkable groups, such as hydroxyl, in one container. A second component contains a corresponding crosslinking agent having crosslinking groups, such as isocyanate groups and is stored in a second container. Just prior to use, the first component and the second component are mixed to form a pot mix. In the context of the invention, the radiation curable composition (X) when used in two-component composition would be admixed to a second component which is at least one polyisocyanate compound.

According to one embodiment, the hydroxyl number IOH of the radiation curable composition (X) may be comprised from 20 to 350 mgKOH/g, preferably from 40 to 250 mgKOH/g and more preferably from 80 to 200 mgKOH/g. The hydroxyl number (IOH) is expressed in mg KOH per gram. It is typically measured by derivatisation of the hydroxyl function with a reactant. In particular, it corresponds to the ratio of the mass of potassium hydroxide mKOH having the same number of hydroxyl groups as the sample, and the mass m of that sample. All the hydroxyl number values which are indicated are based on the dry matters. The hydroxyl number IOH of the radiation curable composition (X) may preferably be at least 20 mgKOH/g, more preferably at least 40 mgKOH/g and most preferably at least 80 mgKOH/g. According to one embodiment, the hydroxyl number IOH of the radiation curable composition (X) may preferably be at most 350 mgKOH/g, more preferably at most 250 mgKOH/g and most preferably at most 200 mgKOH/g. According to one embodiment, the hydroxyl number IOH is measured by the following method:

Step 1—Acetylation step: All hydroxyl functions are acetylated at 75° C. by acetic chloride;

Step 2—The excess of acetic chloride is hydrolysed by a solution of N-methyl-2-pyrrolidone (NMP) in water and Step 3—Titration step: The formed acid functions are titrated with KOH 0.5 N solution.

The radiation curable composition (X) may preferably show a weight average molecular weight (Mw) which is from 5,000 Daltons to 200,000 Daltons, preferably from 8,000 Daltons to 100,000 Daltons, and more preferably from 10,000 Daltons to 60,000 Daltons. According to one embodiment, the weight average molecular weight (Mw) of the (meth)acrylated acrylic polymer (AA) comprising pendant hydroxyl groups is at most 200,000 Daltons, more preferably at most 100,000 Daltons and most preferably at most 60,000 Daltons. The weight average molecular weight (Mw) of the (meth)acrylated acrylic polymer (AA) comprising pendant hydroxyl groups may be at least 5,000 Daltons, more preferably at least 8,000 Daltons and more preferably at least 10,000 Daltons.

According to one embodiment, the weight average molecular weight (Mw) is measured according to the standard DIN 55672-1.

The radiation curable composition (X) has an amount of ethylenically unsaturated groups from 1 to 6, preferably from 1.5 to 5 and more preferably from 2.5 to 4 milliequivalent per gram of solid material.

At least one water-insoluble (meth)acrylic polymer (AP) comprising pendant hydroxyl groups is used as a reactant for preparing the radiation curable composition (X) comprising at least one (meth)acrylated acrylic polymer (AA) comprising pendant hydroxyl groups. According to a preferred embodiment, the at least one water-insoluble (meth)acrylic polymer (AP) comprising pendant hydroxyl groups may preferably comprise at least one (meth)acrylate group or function.

By "a water-insoluble compound" is meant to designate in the present invention a compound that is not self-dispersible, not self-emulsifiable, that does not form a dispersion nor an emulsion in water in the presence of one or more external emulsifiers. More in particular compounds (AP) are compounds that are not self-dispersible, not self-emulsifiable, and not water-dilutable. By a "self-dispersible compound" is meant to designate in the present invention a compound that, when mixed with water, forms a stable two-phase system of small particles dispersed in water without the aid of an additional emulsifier. By a "self-emulsifiable compound" is meant to designate in the present invention a compound that, when mixed with water, forms a stable two-phase system of small droplets dispersed in water without the aid of an additional emulsifier. By "stable" is meant to designate herein that there is substantially no coalescence (droplets) nor flocculation (particles) leading to phase separation, creaming or sedimentation of the heterogeneous system after 1 day, preferably not even after 2 or more days, typically 4 or more days, most preferably not even after 10 days at 60° C. By a "water-dilutable compound" is meant to designate in the present invention a compound that permits to form a homogeneous, single phase mixture when the compound is mixed with water over a broad concentration range such as for instance from 5 to 75 wt % of water in the total mass of water and the compound, and this in the absence of external emulsifiers.

The water-insoluble (meth)acrylic polymer (AP) comprising pendant hydroxyl groups is in particular obtained from the reaction of:

a1) at least one hydroxy functional ethylenically unsaturated monomer (AP1), and a2) at least one ethylenically unsaturated monomer (AP2) which is different from (AP1).

The hydroxy functional ethylenically unsaturated monomer (AP1) has at least one hydroxyl group. The hydroxy functional ethylenically unsaturated monomer (AP1) may comprise primary hydroxyl groups or/and secondary hydroxyl groups. Preferably, the hydroxy functional ethylenically unsaturated monomer (AP1) has at least one secondary hydroxyl group. According to one embodiment, the hydroxy functional ethylenically unsaturated monomer (AP1) may be a mono-hydroxy functional compound, which means that it comprises only one hydroxyl group.

According to one embodiment, the ethylenically unsaturated functionality of the hydroxy functional ethylenically unsaturated monomer (AP1) is selected from the group consisting of allyl groups, vinyl groups, (meth)acrylamide and/or from (meth)acryloyl groups and any mixture thereof. Compounds that contain only one ethylenically unsaturated functionality are preferred.

According to a preferred embodiment, the hydroxy functional ethylenically unsaturated monomer (AP1) is a hydroxy functional (meth)acrylate monomer (AP11). The term "(meth)acrylate" as used herein is meant to encompass both acrylate and methacrylate compounds, that are compounds that comprise at least one acrylate ($CH_2=CHCOO-$) and/or methacrylate ($CH_2=CCH_3COO-$) group. Compounds that contain only one (meth)acrylate functionality are preferred.

Preferred are hydroxy functional alkyl (meth)acrylates with from 1 to 12 carbon atoms in the alkyl chain. Equally suitable are polyalkoxylated (meth)acrylates with from 2 to 300 carbon atoms in the polyalkoxylated chain, more typically from 2 to 60 carbon atoms in the polyalkoxylated chain. Examples thereof are the alkyl (meth)acrylate esters of a polyol. The alkyl chain may be linear or branched. By polyol is meant to designate an alcohol with at least 2 hydroxyl groups. Preferred are polyols that have a linear or branched alkyl chain with from 1 to 12, preferably from 1 to 6 and most preferably from 1 to 4 carbon atoms, and/or polyols that have a linear or branched polyoxyalkylated portion that contains from 2 to 300 carbon atoms, more in particular from 2 to 60 carbon atoms. Suitable examples of hydroxy functional alkyl (meth)acrylates include hydroxyethyl(meth)acrylate, hydroxypropyl(meth)acrylate, hydroxyl-butyl(meth)acrylate, hydroxymethyl (meth)acrylate, hydroxyethyl (meth)acrylate, hydroxypropyl (meth)acrylate, hydroxybutyl (meth)acrylate, hydroxypentyl(meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth)acrylate, hydroxytridecyl (meth)acrylate, hydroxytetradecyl (meth)acrylate, glycerol monoacrylate, polyethyleneoxide mono (meth)acrylate, polypropyleneoxide mono(meth)acrylate and block copolymers of polyethyleneoxide and polypropyleneoxide, mono(meth)acrylate. When the hydroxy functional ethylenically unsaturated monomer (AP1) comprises at least one monomer which is selected from the group consisting of polyethyleneoxide mono(meth)acrylate, polypropyleneoxide mono(meth)acrylate and block copolymers of polyethyleneoxide and polypropyleneoxide, mono(meth) acrylate, the amount of this at least one monomer should not exceed 5 wt. % compared to the total weight of the water-insoluble ethylenically unsaturated polymer (AP) comprising pendant hydroxyl groups. As a result, the water-insolubility property of the water-insoluble ethylenically unsaturated polymer (AP) comprising pendant hydroxyl groups will not be affected.

Preferred are hydroxypropyl(meth)acrylate, and in particular hydroxypropyl methacrylate.

Any of those hydroxy functional (meth)acrylate monomers (AP11) can be further reacted with lactones, which add to these hydroxyls in a ring-opening reaction. Examples of suitable lactones are γ-butyrolactone, δ-valerolactone and, in particular, ε-caprolactone. Glycolide and lactide can be used for the same purpose.

Other examples of hydroxy functional (meth)acrylate monomers (AP11) are compounds obtained from the reaction of an aliphatic, cycloaliphatic or aromatic carboxylic acid with another compound bearing one epoxy functionality and one ethylenically unsaturated functionality. Other preferred compounds are obtained from the reaction of an ethylenically unsaturated carboxylic acid with another compound bearing one epoxy functionality. Particularly suitable is the reaction of the glycidyl ester of a $C_9$-$C_{11}$ versatic acid (e.g. Cardura®E10P) with (meth)acrylic acid. The reaction of the $C_9$-$C_{11}$ versatic acid (e.g. Cardura®E10P) with (meth) acrylic acid may in particular occur before, simultaneously or after the (meth)acrylate copolymerization reaction.

Any mixtures of the above-mentioned examples of hydroxy functional (meth)acrylate monomers (AP11) may be used.

The hydroxy functional (meth)acrylate monomers (AP11) may be selected preferably from the group consisting of hydroxy functional alkyl (meth)acrylates with from 1 to 12 carbon atoms in the alkyl chain, the reaction product of an ethylenically unsaturated carboxylic acid with another compound bearing one epoxy functionality and any mixtures thereof.

According to one embodiment, the hydroxy functional (meth)acrylate monomers (AP11) is selected from the group consisting of hydroxypropyl(meth)acrylate, the reaction product of the glycidyl ester of a $C_9$-$C_{11}$ versatic acid (e.g. Cardura®E10P) with (meth)acrylic acid and any mixtures thereof.

The hydroxy functional ethylenically unsaturated monomer (AP1) may be a hydroxy functional allylic monomer (AP12). Suitable hydroxy functional allylic monomers (AP12) are allylic alcohols which include but are not limited to allyl alcohol, methallyl alcohol, 2-ethyl-2-propen-1-ol, trimethylopropane monoallyl ether and ethoxylated or propoxylated derivatives and/or mixtures thereof. Preferably the hydroxy functional allylic monomer (AP12) is allyl alcohol. The hydroxy functional allylic monomer (AP12) can be used as such or in combination with other hydroxy functional ethylenically unsaturated compounds.

Any mixtures of the hydroxy functional (meth)acrylate monomer (AP11) and the hydroxy functional allylic monomer (AP12) may be used.

The amount of the hydroxy functional ethylenically unsaturated monomer (AP1) may be from 15 wt. % to 95 wt. %, preferably from 30 wt. % to 90 wt. %, more preferably from 50 wt. % to 85 wt. % and most preferably from 60 wt. % to 80 wt. % compared to the total weight of the water-insoluble (meth)acrylic polymer (AP) comprising pendant hydroxyl groups.

The ethylenically unsaturated monomer (AP2) comprises at least one ethylenically unsaturated functionality.

The ethylenically unsaturated monomer (AP2) is different from the hydroxy functional ethylenically unsaturated monomer (AP1). According to one embodiment, the ethylenically unsaturated monomer (AP2) does not comprise any hydroxyl group.

The ethylenically unsaturated monomer (AP2) can be for instance selected from the group consisting of styrenic derivative monomers (AP21), monomers (AP22) which are esters of (meth)acrylic and crotonic acid with saturated linear or cyclic alcohols, functionalized monomers (AP23), acidic monomers (AP24) and any mixtures thereof.

Examples of styrenic derivative monomers (AP21) can be selected from the group consisting of styrene, vinyltoluene, alpha-methylstyrene, ethylstyrene, isopropylstyrene, tert-butylstyrene, 2,4-dimethylstyrene, diethylstyrene, o-methylisopropylstyrene, chlorostyrene, fluorostyrene, iodostyrene, bromostyrene, 2,4-cyanostyrene, hydroxystyrene, nitrostyrene, phenylstyrene and any mixture thereof.

Monomers (AP22) which are esters of (meth)acrylic and crotonic acid with saturated linear or cyclic alcohols, have preferably saturated linear or cyclic alcohols containing 1 to 20, more preferably from 1 to 14, carbons on the alkyl or cyclic group. Examples include but are not limited to alkyl(meth)acrylates such as methyl (meth)acrylate, ethyl (meth)acrylate, propyl (meth)acrylate, butyl (meth)acrylate, pentyl (meth)acrylate, hexyl (meth)acrylate, heptyl (meth) acrylate, octyl (meth)acrylate, nonyl (meth)acrylate, decyl (meth)acrylate, undecyl (meth)acrylate, dodecyl (meth) acrylate, tridecyl (meth)acrylate, tetradecyl (meth)acrylate and isobornyl (meth)acrylate. Monomers (AP22) can also be selected from heterocyclic (meth)acrylates like for instance tetrahydrofurfuryl (meth)acrylate and any mixtures thereof.

Functionalized monomers (AP23) include (meth)acrylamide, vinyl acetate, (meth)acrylonitrile, N-vinylformamide, N-vinylpyrrolidone, N-butoxymethyl (meth)acrylamide, N-methylol (meth)acrylamide and monomers that contain besides a polymerizable group such as a vinyl, (meth)acrylamide or (meth)acryl group also a keto group, such as diacetone (meth)acrylamide; an aceto acetoxy group, such as acetoacetoxyethyl (meth)acrylate or an ureido group (also called a 2-Oxo-1-imidazolidinyl group), such as N-(2-(meth)acryloyloxyethyl)-ethylene urea (also called 2-(2-Oxo-1-imidazolidinyl)ethyl (meth)acrylate), ureido (meth)acrylate) and any mixtures thereof.

Acidic monomers (AP24) may be used as well. However, these acidic monomers must be added in such amounts which do not render soluble in water the water-insoluble (meth)acrylic polymer (AP) comprising pendant hydroxyl groups. According to one embodiment, the amount of the acidic monomers (AP24) should not exceed 5 wt. % and preferably should not exceed 3 wt. % and more preferably should not exceed 2 wt. % compared to the total weight of the water-insoluble (meth)acrylic polymer (AP) comprising pendant hydroxyl groups.

Acidic monomers (AP24) comprise at least one acid group or group capable of forming an acid group when contacted with water and at least one ethylenically unsaturated group. By a "group capable of forming an acid group" is meant any group such as anhydrides and esters able to lead to the formation of an acid group when contacted with water in suitable conditions. Esters able to lead to the formation of an acid group when contacted with water are typically activated esters such as —C(=O)—O—R, wherein R is an electron-withdrawing activating group such as N-hydroxysuccinimide or the like. Those groups can be converted into acid groups by conventional methods known to the skilled person. Suitable monomers (AP24) include (meth)acrylic acid, β-carboxyethyl(meth)acrylate, crotonic acid, maleic acid, fumaric acid, itaconic acid, mesaconic acid, methylenemalonic acid, citraconic acid and their anhydrides, 4-methacryloyloxyethyl trimellitate anhydride, (meth) acrylic acid N-hydroxysuccinimide ester, 2-(meth)acrylamido-2-methylpropanesulfonic acid, (meth)acrylamidosulfonic acid, vinylsulfonic acid, allylsulfonic acid, vinylphosponic acid, allylphosphonic acid and mixtures thereof. The monomer (AP24) is preferably (meth)acrylic acid, crotonic acid or mixtures thereof, more preferably (meth)acrylic acid, most preferably acrylic acid.

According to one embodiment, the at least one ethylenically unsaturated monomer (AP2) is selected from the group consisting of styrene, methyl (meth)acrylate, ethyl (meth)acrylate, butyl(meth)acrylate, (meth)acrylic acid and any mixture thereof.

The amount of the ethylenically unsaturated monomer (AP2) may be preferably from 5 wt. % to 85 wt. %, more preferably from 10 to 70 wt. % and most preferably from 20 wt. % to 50 wt. % compared to the total weight of the water-insoluble (meth)acrylic polymer (AP) comprising pendant hydroxyl groups.

According to one specific embodiment, at least one hydroxy functional ethylenically unsaturated monomer (AP1) and/or at least one ethylenically unsaturated monomer (AP2) comprises at least one (meth)acrylate functionality.

The water-insoluble (meth)acrylic polymer (AP) comprising pendant hydroxyl groups used in the invention preferably has a weight average molecular weight (Mw) comprised between 2,000 and 100,000 Daltons, preferably from 5,000 Daltons to 50,000 Daltons, more preferably from 8,000 Daltons to 40,000 Daltons and most preferably from 10,000 to 30,000 Daltons. Preferably the Mw of the water-insoluble (meth)acrylic polymer (AP) comprising pendant hydroxyl groups is at least 2,500 Daltons, typically at least 5,000 Daltons, preferably at least 8,000 Daltons, and more preferably at least 10,000 Daltons. Preferably the Mw of the water-insoluble (meth)acrylic polymer (AP) comprising pendant hydroxyl groups is at most 100,000 Daltons, preferably at most 50,000 Daltons, more preferably at most 40,000 Daltons and most preferably at most 30,000 Daltons.

The water-insoluble (meth)acrylic polymer (AP) comprising pendant hydroxyl groups used in the present invention shows a glass transition temperature (Tg) of at least 20° C., preferably at least 30° C., more preferably at least 40° C. and most preferably at least 50° C. The water-insoluble (meth)acrylicpolymer (AP) comprising pendant hydroxyl groups used in the present invention shows a glass transition temperature (Tg) of at most 90° C., preferably at most 80° C., more preferably at most 75° C. and most preferably at most 70° C. According to one embodiment, the water-insoluble (meth)acrylicpolymer (AP) comprising pendant hydroxyl groups has a glass transition temperature (Tg) comprised between 20° C. and 90° C., preferably between 30° C. and 80° C., more preferably between 40° C. and 75° C. and most preferably between 50° C. and 70° C. According to one embodiment, the glass transition (Tg) is measured by dynamic scanning calorimetry (DSC) according to the standard ASTM E1356-08.

The water-insoluble (meth)acrylic polymer (AP) comprising pendant hydroxyl groups shows a hydroxyl number (IOH) of at least 50 mg KOH/g, preferably at least 75 mg KOH/g, more preferably at least 150 mg KOH/g and more preferably at least 200 mg KOH/g. The water-insoluble (meth)acrylic polymer (AP) comprising pendant hydroxyl groups shows a hydroxyl number (IOH) of at most 500 mg KOH/g, preferably at most 400 mg KOH/g, more preferably at most 350 mg KOH/g and most preferably at most 300 mg KOH/g. According to one embodiment, the hydroxyl number of the water-insoluble (meth)acrylicpolymer (AP) comprising pendant hydroxyl groups is comprised from 50 mg KOH/g to 500 mg KOH/g, preferably from 75 mg KOH/g to 400 mg KOH/g, more preferably from 150 mg KOH/g to 350 mg KOH/g and most preferably from 200 mg KOH/g to 300 mg KOH/g. According to one embodiment, the hydroxyl number IOH is measured by the following method:

Step 1—Acetylation step: All hydroxyl functions are acetylated at 75° C. by acetic chloride;

Step 2—The excess of acetic chloride is hydrolysed by a solution of N-methyl-2-pyrrolidone (NMP) in water and Step 3—Titration step: The formed acid functions are titrated with KOH 0.5 N solution.

The amount of the water-insoluble (meth)acrylic polymer (AP) comprising pendant hydroxyl groups may be from 20 wt. % to 85 wt. % based on the total weight of the radiation curable composition (X). Preferably, this amount is at least 30 wt. % and more preferably at least 40 wt. % based on the total weight of the radiation curable composition (X). According to one embodiment, the amount of the water-insoluble (meth)acrylic polymer (AP) comprising pendant hydroxyl groups is at most 80 wt. %, and more preferably at most 60 wt. % based on the total weight of the radiation curable composition (X). The amount of the water-insoluble (meth)acrylic polymer (AP) comprising pendant hydroxyl groups may be from 30 wt. % to 80 wt. % and more preferably from 40 to 60 wt. % based on the total weight of the radiation curable composition (X).

The water-insoluble (meth)acrylic polymer (AP) comprising pendant hydroxyl groups is a copolymer and may be a random, alternating or block copolymer. It is preferably a random copolymer.

The copolymerization takes place by radical copolymerization. This may take place in a manner known to the skilled person by conventional methods, particularly by radical polymerization using thermal radical initiators. Examples of suitable thermal radical initiators include peroxides, such as benzoyl peroxide, di-tert-butyl peroxide or tert.Amylperoxy-2-ethylhexanoate, tert-Butylperbenzoate, tert-Butylperoctoate, di-tert-amyl peroxide, azo compounds, such as azo-bis-isobutyronitrile, and the like. The initiators may be used, for example, in amounts from 0.01 to 5.0 wt % of the starting monomers, preferably from 1.0 to 5.0 wt %.

To achieve a good control of the molecular weight and its distribution, a chain transfer agent, preferably of the mercaptan type, such as n-dodecylmercaptan, tert-dodecanethiol, iso-octylmercaptan, n-octylmercaptan, n-butyl-3-mercapto propionate or of the carbon halide type, such as carbon tetra-bromide, bromotrichloromethane, can also optionally be added in the course of the reaction. The chain transfer agent is generally used in amounts up to 5 wt % of the monomers used in the copolymerization.

The copolymerization is generally carried out at a temperature from 60 to 180° C., preferably under an inert gas atmosphere. Polymerization can be conducted under atmospheric pressure or under pressure.

The copolymerization is generally performed until the conversion of monomers is at least 96%, quantified by the reaction product solid content according to DIN EN ISO 3251.

The isocyanate group-containing monoadduct (MA) comprising at least one (meth)acrylate group and which attaches to the (meth)acrylic polymer (AP) comprising pendant hydroxyl groups by an urethane linkage is the reaction product of:

b1) at least one polyisocyanate (MA1), and
b2) at least one hydroxy functional (meth)acrylate monomer (MA2).

In particular, at least one NCO group of the polyisocyanate (MA1) reacts with at least one hydroxyl group of the hydroxy functional (meth)acrylate monomer (MA2) in order to form an urethane linkage. After the reaction of the polyisocyanate (MA1) with the hydroxy functional (meth) acrylate monomer (MA2), at least one NCO group must remain free, preferably about one NCO group may be free. It means that the isocyanate groups-containing monoadduct (MA) comprising at least one (meth)acrylate group comprises at least one free NCO group and preferably about one free NCO group. Indeed, this remaining unreacted NCO group is needed to allow the reaction between the resulting isocyanate group-containing monoadduct (MA) comprising at least one (meth)acrylate group and the water-insoluble (meth)acrylic polymer (AP) comprising pendant hydroxyl groups. Thus, there is an excess in equivalent of the polyisocyanates (MA1) compared to the hydroxy functional (meth)acrylate monomer (MA2).

The isocyanate group-containing monoadduct (MA) comprising at least one (meth)acrylate group may be prepared in a separate step before its reaction with the water-insoluble (meth)acrylic polymer (AP) comprising pendant hydroxyl groups. Alternatively, the formation of the isocyanate group-containing monoadduct (MA) comprising at least one (meth) acrylate group may also occur simultaneously when admixing the polyisocyanate (MA1) and the hydroxy functional (meth)acrylate monomer (MA2) with the water-insoluble (meth)acrylic polymer (AP) comprising pendant hydroxyl groups. In this case, the water-insoluble (meth)acrylic polymer (AP) comprising pendant hydroxyl groups, the polyisocyanate (MA1) and the hydroxy functional (meth)acrylate monomer (MA2) are admixed together. As a result, the isocyanate group-containing monoadduct (MA) comprising at least one (meth)acrylate group is prepared in situ and reacts with the water-insoluble (meth)acrylic polymer (AP) comprising pendant hydroxyl groups for forming the (meth) acrylated acrylic polymer (AA) comprising pendant hydroxyl groups.

According to the invention, at least one polyisocyanate (MA1) is used to prepare the isocyanate group-containing monoadduct (MA) comprising at least one (meth)acrylate group. By a "polyisocyanate" (MA1) is meant to designate organic compounds that comprise at least two and typically up to six isocyanate groups. The polyisocyanate compound usually comprises not more than six isocyanate groups and preferably not more than 3 isocyanate groups. The polyisocyanate (MA1) is most preferably a di-isocyanate. The polyisocyanate (MA1) is generally selected from aliphatic, cycloaliphatic, aromatic and/or heterocyclic polyisocyanates or combinations thereof. Possibly the polyisocyanate (MA1) contains allophanate groups, biuret and/or isocyanurate groups.

Examples of aromatic polyisocyanates that may be used are 1,4-diisocyanatobenzene (BDI), 2,4-diisocyanatotoluene (toluene diisocyanate (TDI)), 1,1'-methylenebis[4-isocyanatobenzene] (MDI), xylilene diisocyanate (XDI), 1,5-naphtalene diisocyanate (NDI), tolidine diisocyanate (TODI), tetramethylxylylene diisocyanate (TMXDI) and p-phenylene diisocyanate (PPDI). Other examples of polyisocyanates that may be used in the context of the invention are trimethyl 1,6 hexamethylene diisocyanate, 4,4'-diisocyanatodicyclohexylmethane, 4,4'-diisocyanatodiphenylmethane, the technical mixtures with 2,4-diisocyanatodiphenylmethane and also the higher homologues of above mentioned diisocyanates, 2,4-diisocyanatotoluene and technical mixtures of them with 2,6-diisocyanatotoluene, as well as the copolymerization product of 3-isopropenyl-α,α'-dimethylbenzyl isocyanate (TMI). Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Polyisocyanates containing more than two isocyanate groups are for example the derivatives of above mentioned diisocyanates like 1,6-diisocyanatohexane biuret and isocyanurate.

Preferred in the context of the invention are aliphatic and/or cycloaliphatic polyisocyanates, more preferably diisocyanates. Particularly preferred are aliphatic or cycloaliphatic diisocyanates and more in particular cycloaliphatic diisocyanates. Especially preferred are 1,6-diisocyanatohexane (HDI) and/or isophorone diisocyanate (IPDI).

The at least one hydroxy functional (meth)acrylate monomer (MA2) used in the present invention may be preferably a mono-hydroxy poly(meth)acrylate compound and more preferably a mono-hydroxy polyacrylate compound. Mixture of several hydroxy functional (meth)acrylate monomers (MA2) may be used.

Useful hydroxy functional (meth)acrylate monomer (MA2) include e.g. the esterification products of aliphatic and/or aromatic polyols with (meth)acrylic acid having a residual average hydroxyl functionality of about 1. The partial esterification products of (meth)acrylic acid with tri-, tetra-, penta- and/or hexahydric polyols are preferred. It is also possible to use reaction products of such polyols with ethylene oxide and/or propylene oxide, or reaction products of such polyols with lactones, which add to these polyols in a ring-opening reaction. Examples of suitable lactones are γ-butyrolactone, δ-valerolactone and, in particular, δ ε-caprolactone. Glycolide and lactide can be used for the same purpose. These modified or unmodified polyols are partly esterified with acrylic acid, methacrylic acid or mixtures thereof until the desired hydroxyl functionality is reached. It is indeed known to those skilled in the art that the (meth)acrylation of polyols proceeds to a mixture of (meth) acrylate components and that an easy and suitable way to characterize the mixture is by measuring its hydroxyl value (mg KOH/g) using an appropriate method (e.g. a titration method).

Suitable hydroxy functional (meth)acrylate monomer (MA2) are for instance compounds comprising at least two (meth)acrylate functions such as glycerol diacrylate, trimethylolpropane diacrylate, pentaerythritol triacrylate, ditrimethylolpropane triacrylate, dipentaerythritol pentaacrylate, and their (poly)ethoxylated and/or (poly)propoxylated equivalents. Particularly preferred are polyacrylated pentaerythritol such as pentaerythritol diacrylate, pentaerythritol triacrylate and pentaerythritol tetraacrylate; and/or polyacrylated dipentaerythrytol: such as dipentaerythritol tetraacrylate, dipentaerythritol pentaacrylate and dipentaerythritol hexaacrylate and any mixture thereof.

Other suitable hydroxy functional (meth)acrylate monomers (MA2) are the hydroxy functional alkyl(meth)acrylates having 1 to 20 carbon atoms in the alkyl group. Preferred molecules in this category are hydroxyethyl (meth)acrylate, hydroxypropyl (meth)acrylate, hydroxybutyl (meth)acrylate and any mixtures thereof.

According to one embodiment, the hydroxy functional (meth)acrylate monomer (MA2) is selected from the group consisting of: pentaerythritol triacrylate, dipentaerythritol pentaacrylate, di(trimethylolpropane) tetraacrylate, and any mixture thereof.

The equivalent ratio of NCO groups to OH groups of the isocyanate group-containing monoadduct (MA) comprising at least one (meth)acrylate group may be from 1:0.50 to 1:0.90, preferably from 1:0.55 to 1:0.80, and more preferably from 1:0.60 to 1:0.75.

According to one embodiment, the isocyanate group-containing monoadduct (MA) comprising at least one (meth) acrylate group is the reaction product of pentaerythritol triacrylate and IPDI.

The amount of the isocyanate group-containing monoadduct (MA) comprising at least one (meth)acrylate group may be from 15 wt. % to 80 wt. % based on the total weight of the radiation curable composition (X). Preferably, this amount is at least 20 wt. % and more preferably at least 40 wt. % based on the total weight of the radiation curable composition (X). According to one embodiment, the amount of the isocyanate group-containing monoadduct (MA) comprising at least one (meth)acrylate group is at most 70 wt. %, and more preferably at most 60 wt. % based on the total weight of the radiation curable composition (X). The amount of the water-insoluble (meth)acrylic polymer (AP) comprising pendant hydroxyl groups may be from 20 wt. % to 70 wt. % and more preferably from 40 wt. % to 60 wt. % based on the total weight of the radiation curable composition (X).

The radiation curable composition (X) may comprise at least one solvent or mixture of solvents. These solvents are used as processing aid to reduce the viscosity of the radiation curable composition (X) during the process. They contain moreover no chemical functionality capable of reacting with isocyanates.

Suitable solvent systems include: ketones, acetates, aromatic hydrocarbons, aliphatic solvent and any mixture thereof. Examples of suitable solvents are butyl acetate, ethyl acetate, methyl acetate, ethoxy propyl acetate, methoxy propyl acetate, propoxy methyl acetate, toluene, xylene, hexane, propylene glycol methyl ether acetate and any mixture thereof. Mixtures of several solvents may be used. According to a preferred embodiment, the solvent is butyl acetate and/or propylene glycol methyl ether acetate.

The amount of the solvent in the radiation curable composition (X) is from 20 wt. % to 80 wt %, more preferably from 30 wt. % to 70 wt % and most preferably from 40 wt. % to 60 wt. % based on the total weight of the radiation curable composition (X).

The radiation curable composition (X) may also comprise at least one catalyst. In particular, the catalyst may be used to facilitate the urethanization reaction between the isocyanate groups and the hydroxyl groups. For instance, a catalyst may be used when reacting the polyisocyanate (MA1) with the hydroxy functional (meth)acrylate monomer (MA2), or when reacting the water-insoluble (meth)acrylic polymer (AP) comprising pendant hydroxyl groups with the isocyanate group-containing monoadduct (MA) comprising at least one (meth)acrylate group. The catalyst is also useful when the radiation curable composition (X) is reacted with at least one polyisocyanate compound (P1) for the dual cure applications.

The catalyst may be metal salts from Tin, Bismuth, Zinc and the like. Preferred catalysts are dibutyltin dilaurate and bismuth neodecanoate. An amine catalyst can also be used, alone or in conjunction with the above metallic catalysts. Suitable amine catalysts include for instance 1,4-diazabicyclo[2,2,2]octane (DABCO). The catalyst may be used, for example, in amounts from 0.005% (50 ppm) to 0,5% (5000 ppm) based on the total weight of radiation curable composition (X).

The radiation curable composition (X) may optionally comprise a (meth)acrylated monomer (C1) or oligomer (C2). Preferred are those that are liquid at room temperature. Some examples of suitable compounds are given below.

The radiation curable composition can also contain lower molecular weight (meth)acrylated monomers (C1) such as (meth)acrylic acid, beta-carboxyethyl acrylate, butyl(meth) acrylate, methyl(meth)acrylate, isobutyl (meth)acrylate, 2-ethylhexyl(meth)acrylate, cyclohexyl (meth)acrylate, n-hexyl (meth)acrylate, isobornyl (meth)acrylate, isooctyl (meth)acrylate, n-lauryl (meth)acrylate, octyl/decyl (meth) acrylate, 2-hydroxyethyl(meth)acrylate, phenoxyethyl (meth)acrylate, nonylphenolethoxylate mono(meth)acrylate, 2-(2-ethoxyethoxy)ethyl(meth)acrylate, 2-butoxyethyl (meth)acrylate, Cardura (meth)acrylate (the (meth)acrylate of the glycidyl ester of neodecanoic acid also known as Cardura® E-10P), phenylglycidylether(meth)acrylate and the ethoxylated or/and propoxylated derivatives thereof, the (meth)acrylates obtained from the esterification with (meth) acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain, 1,6-hexanediol di(meth)acrylate, 3(4),8(9)-bis-(hydroxymethyl)-tricyclo-[5.2.1.0²'6]decane di(meth)acrylate, di or tri propylene glycol di(meth) acrylate, ethoxylated and/or propoxylated neopentylglycoldi (meth)acrylate, isosorbide di(meth)acrylate, and ethoxylated and/or propoxylated derivatives thereof, bisphenol A di(meth)acrylate and the ethoxylated and/or propoxylated derivatives thereof, trimethylolpropanetri(meth)acrylate and the ethoxylated and/or propoxylated derivatives thereof, di-trimethylolpropanetri(meth)acrylate, glyceroltri(meth)acrylate and the ethoxylated and/or propoxylated derivatives thereof, pentaerythritoltriacrylate (PETIA) and the ethoxylated and/or propoxylated derivatives thereof, dipentaerythritol penta or hexaacrylate and the ethoxylate and/or propoxylated derivatives thereof.

Examples of (meth)acrylated oligomers (C2) that can be used in the present invention include amino (meth)acrylate oligomers, polyester (meth)acrylates, (poly)urethane (meth) acrylates and epoxy (meth)acrylates. Once more the acrylated forms are preferred. The oligomers are preferably having a molecular weight of from 500 to 5000 Daltons. The oligomer typically comprises at least 2 functional groups per molecule.

Polyester (meth)acrylate oligomers are well known. These (meth)acrylated polyesters can be obtained by reacting a hydroxyl group-containing polyester backbone with (meth)acrylic acid, or by reacting a carboxyl group-containing polyester backbone with a hydroxy functional alkyl (meth)acrylate such as for example 2-hydroxyethyl acrylate, 2- or 3-hydroxypropyl acrylate, etc. or with glycidyl (meth) acrylate. The polyester backbone can be obtained in a conventional manner by polycondensation of at least one polyhydroxy alcohol, such as ethylene glycol, propylene glycol, butanediol, neopentyl glycol, hexanediol, trimethylolpropane, bisphenol A, pentaerythritol, etc, or/and the ethoxylates and/or propoxylates thereof, with at least one polycarboxylic acid or anhydride thereof such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones and/or polylactides can be used as polyester backbone. For example poly(ε-caprolactone), polylactide and/or poly(lactide,caprolactone) can beobtained by ring-opening polymerization of ε-caprolactone and/or lactide optionally in the presence of one or more polyhydroxy alcohols. Preferred are the polyester (meth) acrylate oligomers commercialized as EBECRYL® 450, EBECRYL® 452, EBECRYL® 657, EBECRYL® 837, EBECRYL® 895, EBECRYL® 810, EBECRYL® 830, EBECRYL® 854 and EBECRYL® 870 all available from Allnex.

Polyether (meth)acrylate oligomers can be prepared by esterification of hydroxyfunctional polyethers with (meth) acrylic acid. Hydroxyfunctional polyethers can be obtained by ring-opening homo- or copolymerization of cyclic ethers such as tetrahydrofuran, ethylene oxide and/or propylene oxide, or can be prepared by reacting polyhydroxy alcohols with ethylene and/or propylene oxide.

Polycarbonate (meth)acrylate oligomers are known. They can be prepared by esterification of hydroxyfunctional polycarbonates with (meth)acrylic acid.

Urethane (meth)acrylate oligomers can be prepared by reacting a di- and/or polyisocyanate, such as hexamethylene-diisocyanate, isophorone-diisocyanate, toluene-diisocyanate, with hydroxyl functional (meth)acrylate. Use can be made exclusively of hydroxyl functional (meth)acrylates such as those mentioned above, but in order to extend the chain, mono- or polyhydroxy alcohols can also be added, such as those mentioned above for the synthesis of polyesters polyesters, polyethers or polycarbonates containing hydroxyl groups. Most preferred are urethane acrylates commercialized as EBECRYL® 220, EBECRYL® 2220, EBECRYL® 1290, EBECRYL® 1290N, EBECRYL® 1291, EBECRYL® 220, EBECRYL® 270, EBECRYL® 264, EBECRYL® 294/25HD, EBECRYL® 8254, EBECRYL® 4680, EBECRYL® 4513, EBECRYL® 8465, EBECRYL® 4654, EBECRYL® 4666, EBECRYL® 4738, EBECRYL® 4740, EBECRYL® 4883, EBECRYL® 5129, EBECRYL® 8210, EBECRYL® 8602, EBECRYL® 8415, EBECRYL® 225 all available from Allnex.

By epoxy (meth)acrylate oligomers is meant to designate the (meth)acrylic esters of epoxides, preferably polyepoxides, i.e. compounds comprising at least one, preferably at least two epoxide functions. Epoxy (meth)acrylate oligomers are generally obtained from the reaction of (meth)acrylic acid with epoxides. The epoxides are generally chosen from epoxidized olefins, glycidyl esters of saturated or unsaturated carboxylic acids, glycidyl ethers of aromatic or aliphatic alcohols or polyols and from cycloaliphatic polyepoxides. Preferred epoxides are diglycidylethers of aromatic and aliphatic diols and cycloaliphatic diepoxides such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of butanediol. Particularly preferred is diglycidyl ether of bisphenol-A. Also epoxidized natural oils or epoxidized phenol-formaldehyde copolymers can be used. Examples of natural oils include soybean oil, linseed oil, perilla oil, fish oil, dehydrated castor oil, tung oil, coconut oil, corn oil, cottonseed oil, olive oil, palm oil, palm kernel oil, peanut oil, sunflower oil, safflower oil, castor oil. Examples of suitable epoxy acrylates include EBECRYL® 600, EBECRYL® 860, EBECRYL® 3420, EBECRYL® 608, EBECRYL® 3608, EBECRYL® 3702, EBECRYL® 3701, EBECRYL® 3700, all available from Allnex.

Optionally amino (meth)acrylates can be added as such to the composition of the invention. Examples of suitable amino (meth)acrylates include EBECRYL® 7100, EBECRYL® 80, EBECRYL® 81, EBECRYL® 83, EBECRYL® 85, EBECRYL® LEO 10551, EBECRYL® LEO 10552 & EBECRYL® LEO 10553, all available from Allnex.

The radiation curable composition (X) may also comprise at least one radical inhibitor. Examples of suitable radical inhibitors for use during the urethanization step include hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. Other examples of suitable inhibitors include phosphines, like triphenylphosphine (TPP), and tris-nonylphenylphosphite (TNPP), phenothiazine (PTZ), triphenyl antimony (TPS), and any mixtures thereof. The total amount of inhibitor used is generally from 0 to 1% by weight of the radiation curable composition (X), preferably from 0.01% to 0.5% by weight, most preferably from 0.01% to 0.1% by weight.

The radiation curable composition (X) may also comprise at least one photochemical initiator capable of initiating the polymerization of the radiation curable polymer composition under UV light. Photochemical initiators (also called photoinitiators) are compounds that can generate radicals by absorption of light, typically UV light.

The amount of photoinitiator in the radiation curable composition (X) is preferably comprised between 0.1% and 10% by weight, more preferably between 0.5 and 5% by weight based on the total weight of the radiation curable composition (X) of the invention. The radiation curable composition (X) according to the invention may also comprise from 0 to 5% by weight of one or more photosensitizers well known in the art. Alternatively, the composition can be cured in the absence of an initiator, especially by electron beam. Examples of suitable photinitiators may be α-hydroxyketones, α-aminoketones, benzildimethyl-ketals, acyl phosphines, benzophenone derivatives, thioxanthones and blends of these and more preferably is selected from the group consisting of α-hydroxyketones, benzophenone, acyl phosphines and any mixtures thereof.

The compositions of the invention may also comprise inert or functional resins, pigments, colorants, fillers and/or other additives suitable to improve the application of the formulated composition on a substrate and including not limitatively wetting agents, antioxidants, flow modification agents, slip agents, fire retardant agents, UV-protection agents, adhesion promoters, rheology modifiers, leveling agents, wetting agents, slip additives, stabilizers, anti-foam agents, alkoxysilanes, water and mixtures thereof. The total amount of pigments, colorants, inert resins, fillers and/or additives in the radiation curable composition (X) of the invention generally does not exceed 60% by weight, preferably it does not exceed 40% by weight compared to the total weight of the radiation curable composition X.

The radiation curable composition (X) may optionally comprise at least one pigment and/or at least one matting agent.

The at least one pigment may be an inorganic pigment and selected from the group consisting of: titanium oxide, zinc oxide, antimony oxide, calcium carbonate, fumed silica, aluminium oxide and any mixture thereof. According to one embodiment, the at least one pigment may be an organic pigment and may be selected from the group consisting of: acid and base dye pigments, diazo pigments, monoazo pigment, phthalocyanine pigments, quinacridone pigments metallic effect pigment and any mixtures thereof.

The at least one matting agent may preferably be an inorganic matting agent, in particular an inorganic oxide matting agent. Preferred matting agents are selected from the group consisting of: $SiO_2$, $Al_2O_3$, $AlPO_4$, MgO, $TiO_2$, $ZrO_2$, $Fe_2O_3$ and mixtures thereof. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

The radiation curable composition (X) comprising the at least one (meth)acrylated acrylic polymer (AA) comprising pendant hydroxyl groups is preferably prepared by the following preparation process, which involves the following steps:

Step 1: Reacting the at least one hydroxy functional ethylenically unsaturated monomer (AP1) with the at least one ethylenically unsaturated monomer (AP2) which is different from (AP1) in order to obtain at least one water-insoluble (meth)acrylic polymer (AP) comprising pendant hydroxyl groups, Step 2: Conducting an urethanization step by admixing the resulting at least one water-insoluble (meth)acrylic polymer (AP) comprising pendant hydroxyl groups:

with at least one NCO group-containing monoadduct (MA) comprising at least one (meth)acrylate group, or with at least one polyisocyanate (MA1) and at least one hydroxy functional (meth)acrylate monomer (MA2), the NCO group-containing monoadduct (MA) comprising at least one (meth)acrylate group being formed in situ.

Another aspect of the invention is a radiation curable composition (Y) comprising:

At least one radiation curable composition (X) as previously described, and

At least one polyisocyanate compound (P1) and wherein the equivalent ratio of the NCO groups to the OH groups of the radiation curable composition (Y) is from 0.7:1 to 1.15:1.

The at least one polyisocyanate compound (P1) concerns compounds with free isocyanate groups. Polyisocyanates with free isocyanate groups are, for example, any organic polyisocyanates with aliphatically, cycloaliphatically, araliphatically and/or aromatically bound free isocyanate groups. Polyisocyanates of this kind are known to the skilled person and described in the literature.

The polyisocyanates are preferably those with an average NCO functionality from 1.5 to 5, preferably 2 to 4.

The so-called "paint (coating) polyisocyanates" are also suitable, for example, those based on hexamethylene diisocyanate (HDI), 1-isocyanato-3,3,5-trimethyl-5-isocyanatomethyl-cyclohexane (IPDI) and/or bis(isocyanatocyclohexyl)-methane and the known derivatives of these diisocyanates containing biuret, allophanate, urethane and/or isocyanurate groups from which excess starting diisocyanate is removed after their preparation, preferably by distillation, to a residual content of less than 0.5 wt. %. Triisocyanates such as nonane triisocyanate may also be used.

Sterically hindered polyisocyanates are also suitable. Examples thereof are 1,1,6,6-tetramethyl-hexamethylene diisocyanate, 1,5-dibutyl-pentamethyl diisocyanate, p- or m-tetramethylxylylene diisocyanate and the corresponding hydrogenated homologues.

In principle, diisocyanates may be reacted in the conventional manner to higher functionality compounds, for example, by trimerization or by reaction with water or polyols such as, trimethylolpropane or glycerol.

Isocyanate-modified resins, e.g., NCO-functional acrylate, polyurethane, polyester and/or epoxy resins may be used in addition to or instead of the above-mentioned polyisocyanates as polyisocyanate compound (P1). Suitable isocyanate-modified resins also include resins with free isocyanate groups and with olefinic double bonds capable of free-radical polymerization. Examples thereof include conventional (meth)acryloyl-functional oligomeric and/or polymeric compounds based on poly(meth)acrylate, polyurethane, polyester, polyester urethane and/or epoxy resins which contain, in addition, one or more isocyanate groups. In particular, the polyisocyanate compound (P1) may be a NCO groups containing polyurethane like for instance Ebecryl® 4150, Ebecryl® 4250, Ebecryl® Ebecryl® 4396, Ebecryl® 4397, Ebecryl® 4510, Ebecryl® 4765 and Ebecryl® 4141, all commercially available from Allnex.

The at least one polyisocyanate compound (P1) may include oligomeric polyisocyanates including, but not limited to, dimers, such as the uretdione of 1,6-hexamethylene diisocyanate, trimers, such as the biuret and isocyanurate of 1.6-hexanediisocyanate (Desmodur® N 3300 commercially available from Covestro) and the isocyanurate of isophorone diisocyanate, and polymeric oligomers.

Modified polyisocyanates can also be used, including, but not limited to, carbodiimides and uretdiones, and mixtures thereof. Examples of preferred polyisocyanates are those containing biuret, isocyanurate and/or iminooxadiazinedione structures. In particular, the polyisocyanate compound (P1) can be an aliphatic, aliphatic/cycloaliphatic and/or cycloaliphatic single-type or mixed trimers based on 1,6-diisocyanatohexane and/or isophorone diisocyanate.

The at least one polyisocyanate compound (P1) may be used individually or in mixture. These are used in the coatings industry, which are described comprehensively in the literature and are also available as commercial products.

According to a preferred embodiment, the at least one polyisocyanate compound (P1) is selected from the group consisting of the biuret and isocyanurate of 1,6-hexanediisocyanate (Desmodur® N 3300 commercially available from Covestro), Ebecryl® 4397 (commercially available from Allnex) and any mixtures thereof.

The equivalent ratio between the NCO groups and the OH groups of the radiation curable composition (Y) is preferably from 0.7:1 to 1.15:1, and more preferably from 0.95:1 to 1.05:1. In this context, the equivalent ratio refers to the NCO groups of the at least one polyisocyanate compound (P1) and the OH groups of the at least one radiation curable composition (X) when reacting both components in order to obtain the radiation curable composition (Y).

The radiation curable composition (Y) may be prepared according to the following preparation process:

Reacting the at least one radiation curable composition (X) as previously described, and the at least one polyisocyanate compound (P1), wherein the amounts of the both components are selected in order to obtain the equivalent ratio of the NCO groups to the OH groups from 0.7:1 to 1.15:1, in the resulting radiation curable composition (Y).

According to one embodiment, the radiation curable composition (X) or the radiation curable composition (Y) is a dual cure composition. "Dual cure" refers to compositions that can be cured by two curing mechanisms, such as radiation and thermal crosslinking. Such compositions require exposure to both radiation (like UV-radiation) and heat to achieve the degree of crosslinking necessary to achieve desired performance properties. Thus, in one aspect, the coating compositions of the invention may be at least partially curable upon exposure to radiation. In another aspect of the invention, the coating compositions of the invention may be at least partially thermally curable upon exposure to heat energy.

The radiation curable composition (X) or the radiation curable composition (Y) is energy curable and is cured by irradiation, typically by ultraviolet radiation, generally in the presence of a photo-initiator; they can also be cured by electron-beam irradiation, allowing the use of compositions free of photo-initiator. Radiation curing is accomplished preferably by exposure to high-energy radiation, i.e. UV radiation or daylight, e.g. light with a wavelength of 172 to 750 nm, or by bombardment with high-energy electrons (electron beams, 70 to 300 keV). Various types of actinic radiation can be used such as ultraviolet (UV) radiation, gamma radiation, and electron beam. A preferred means of radiation curing is ultraviolet radiation. According to one embodiment, the UV radiations are UV-A, UV-B, UV-C and/or UV-V radiations.

Examples of suitable radiation sources for light or UV light include high-pressure mercury vapor lamps, it being possible for the mercury vapor to have been modified by doping with other elements such as gallium or iron. Lasers, pulsed lamps (known under the designation UV flashlight lamps), halogen lamps or excimer lamps, high or low pressure gallium lamps, mercury lamps, cold cathode tubes, xenon lamps, black lights, UV Low energy ultraviolet light sources (LED), a UV laser and a flash light may be used as well.

The lamps may be installed stationarily, so that the material to be irradiated is moved past the radiation source by means of a mechanical apparatus, or the lamps may be mobile and the material for irradiation does not change its location during the cure. The radiation dose that is normally sufficient for crosslinking in the case of UV curing is situated in the range from 0.1 to 2000 $mJ/cm^2$.

Irradiation can where appropriate also be carried out in the absence of oxygen, such as under an inert gas atmosphere or oxygen-reduced atmosphere, for example. Suitable inert gases are preferably nitrogen, carbon dioxide, noble gases or combustion gases. Irradiation can also take place with the coating covered with media that are transparent to the radiation. Examples thereof are, for example, polymeric films, glass or liquids.

The radiation curable compositions (X) and (Y) according to the present invention allow obtaining coatings with satisfying properties on any kind of substrate. In particular, the radiation curable compositions (X) and (Y) show a low tackiness and preferably are tack free before being cured. The radiation curable compositions (X) and (Y) of the invention can be applied by the customary techniques to any of a very wide variety of substrates, such as by spraying, rolling, knife coating, pouring, spraying, brushing, impregnating, dipping, printing or other transfer methods, for example. Preferably the radiation curable compositions (X) and (Y) of the invention can be applied by spray or roller application. Suitable substrates are, for example, wood, ceramic, composite, metal, including in particular metal as used in the applications known as wire, coil, can or container coating, and also plastic, especially ABS, ABS/PC, AMMA, ASA, CA, CAB, EP, UF, CF, MF, MPF, PC, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1), paper, leather, textiles, felt, glass, concrete, inorganically bonded substrates such as wood cement boards and asbestos cement boards, electronic component assemblies or mineral substrates. It is also possible to paint substrates which are composed of different materials from among those stated, or substrates which have already been coated. A further possibility is to apply the radiation curable composition (X) or (Y) to a substrate only temporarily, then to cure them partly or fully and to detach them again, in order for example to produce sheets, films or foils, in particular plastic foils. The radiation curable composition (X) or (Y) may be used in the coating of vehicles, in particular automotive bodies or add-on parts, preferably in the form of clear coats.

Another aspect of the invention is the use of the radiation curable composition (X) or the use of the radiation curable composition (Y) for dual cure application, for instance, for preparing post-formable films.

The radiation curable composition (X) or the radiation curable composition (Y) may also be used for conformal coating or as an adhesion promoter.

Another aspect of the invention is a coating, an adhesive, an ink, a plastic foil or an overprint varnish prepared from a radiation curable composition (X) or from a radiation curable composition (Y).

The present invention relates to an article coated with a radiation curable composition (X) or (Y).

The radiation curable composition (X) or (Y) may be a one-component (1-K) or two-components system (2-K) as desired.

The present invention also refers to a method of curing of the radiation curable composition (X) which comprises the following steps:
  step 1: flashing off optionally added solvents, preferably at room temperature or at elevated temperature, preferably up to 80° C. Optionally also by means of a stream of heated gas (e.g. air). The temperature increase may be brought about by known methods such as infrared or near-infrared radiators or by ovens heated in other ways, and
  step 2: radiation curing with radiation sources as for example ultraviolet (UV) radiation, gamma radiation, or electron beam.

The method of curing of the radiation curable composition (Y) is carried out according to the following steps:
  step 1: flashing off optionally added solvents, preferably at room temperature or at elevated temperature, preferably up to 80° C. Optionally also by means of a stream of heated gas (e.g. air). The temperature increase may be brought about by known methods such as infrared or near-infrared radiators or by ovens heated in other ways,
  step 2: radiation curing with for example radiation sources as ultraviolet (UV) radiation, gamma radiation, or electron beam, and
  step 3: thermal curing by crosslinking the NCO-containing constituents with the isocyanate-reactive compounds.

This can be carried out at elevated temperature, advantageously below 150° C. The temperature may be increased by known methods such as infrared or near-infrared radiators or by ovens heated in other ways. When post-curing is complete, a cooling phase may follow before the coated articles undergo further handling. Steps 2 and 3 may be performed in either order.

The radiation curable composition (Y) is typically packaged in two separate containers. End users have to mix the two parts in a specific ratio just prior use, employing conventional mixing equipment and most preferably with appropriate measures to minimize source of radiations. As soon as the two packs are mixed, the isocyanates groups start to react with the hydroxyl group leading to a slow, continuous and not reversible reaction. The time during which the radiation curable composition can be used is defined as "pot life". The pot life of a specific radiation curable composition is typically determined empirically. The end of the pot life is usually achieved once the initial viscosity of the ready to use formulation has doubled. End users can also employ if desired dual head spray gun to facilitate handling: in such conditions formulation pot life is enhanced and the two components are mixed after spray application.

Addition of solvent might be done to facilitate the spray application. Catalyst is frequently added to fasten the OH—NCO crosslinking.

Radiation cure and thermal cure may occur sequentially or concurrently. In a preferred embodiment, the radiation curable compositions of the invention will be subjected to a first stage of curing followed by a second stage of curing. Either radiation cure or thermal cure may occur first. In one embodiment, the radiation curable compositions of the invention will first be subjected to radiation (like UV radiation), followed by a second stage of cure, wherein the radiation curable compositions previously subjected to radiation (like UV radiation) curing will be subjected to a thermal cure (usually for 3D parts). In another embodiment, the two-stage curing process is achieved by the reaction of NCO—OH groups by means of forced drying (circulating air or IR) in order to prevent the inclusion of solvents and to ensure curing in the shadow zones that are not reached by radiation (preferably UV rays). The workpiece owes its final surface properties to downstream polymerisation which is effected in a matter of seconds by means of radiation source (like UV light) and allows immediate onward processing of the workpiece (thermoforming and high pressure forming of coated films.

Solvent flash off and partial thermal curing is typically performed upon forced drying for between 7 and 10 minutes at 60-80° C. (circulating air or IR).

Conditioning step, which typically consists in completion of the OH/NCO crosslinking, is done by letting the coating composition react a week at room temperature. But one may obtain an accelerated conditioning by heating at 60° C. for two days in order to achieve same curing as a curing at room temperature for one week.

The second stage does not have to immediately succeed the first stage and can occur after the application of one or more subsequently applied coatings.

For example, it is within the scope of the invention to apply one or more additional coating compositions to the radiation cured coating of the invention and then simultaneously thermally cure the one or more additionally applied coatings together with the radiation cured coating of the invention. These steps can be performed in either order.

The present invention also refers to a method of coating a substrate with a radiation curable composition (X) or a radiation curable composition (Y) which comprises the steps of:

Step 1: Applying the radiation curable composition (X) or (Y) to at least one surface of a substrate and Step 2: Curing the radiation curable coating composition (X) or (Y) by submitting the coated substrate to the radiation and/or to the heat. When using both radiation and heat for curing, the curing steps may be performed in any order or at the same time.

All the embodiments previously mentioned may be individually implemented or may be combined within reason.

The invention is now further described in more details in the following examples, which in no way intend to limit the invention or its applications.

EXPERIMENTAL DATA

List of Materials:
ABS: Acrylonitrile butadiene styrene, Magnum 3616, Dow
PC: Polycarbonate, Lexan 9030, Sabic.
ABS/PC: Bayblend T65, Bayer
HPMA: hydroxyl propyl methacrylate, monomer, Evonik.
MMA: methyl methacrylate, monomer, Evonik.
Sty: styrene, monomer, Brenntag.
BuA: butyl acrylate, monomer, BASF.
BuMA: butyl methacrylate, monomer, Evonik.
AA: acrylic acid, monomer, BASF.
EA: ethyl acrylate, monomer, Arkema.
Cardura® E10P: glycidyl ester of Versatic Acid 10, monomer, Hexion.
TAPEH: t-amyl peroxy-2-ethylhexanoate, initiator, Arkema.
BAC: butyl acetate, solvent, Celanese.
IPDI: isophorone diisocyanate, Evonik.
PETIA: pentaerythritol triacrylate, Allnex.
BHT: butylated hydroxytoluene, stabilizer, Innochem.
Valikat Bi2010: bismuth neodecanoate, catalyst, Umicore.
Additol® CPK: 1-hydroxy-cyclohexylphenyl-ketone, photoinitiator, Allnex.
Desmodur® N 3300: Aliphatic polyisocyanate (HDI trimer), Covestro.
DBTL: dibutyl tin dilaurate, catalyst, Vesta Intracon.
Modaflow® 9200: Acrylic flow modifier, without silicone addition, Allnex.
Neorad® A20: acrylated acrylic in 50% BAC commercially available from DSM.

The measurements were done according to following standards:

Hydroxyl values (IOH in mg KOH/g) were measured using the following method. This "OH Number" method covers the automated quantification procedure for hydroxyl groups by means of potentiometric titration. The hydroxyl number is defined as the number of milligrams of potassium hydroxide required to neutralize the hydrolysis product of the fully acetylated derivative prepared out of one gram of resin. Step 1-Acetylation step: All hydroxyl functions are acetylated at 75° C. by acetic chloride. Step 2-Hydrolysis step: The excess of acetic chloride is hydrolysed by a solution of N-methyl-2-pyrrolidone (NMP) in water. Step 3-Titration step: The formed acid functions are titrated with KOH 0.5 N solution.

The isocyanate content (I NCO in meq/g) can be followed by back-titration of residual dibutylamine (0.5N) in N-Methylpyrolydone with chlorhydric acid (0.1N) in 2-propanol in accordance with the test method ASTM E200-72.

The solids content was measured by the gravimetric method involving drying the solution during 2 h at 125° C.

The viscosity of the resin is measured at a fixed shear rate with a cone and plate type rheometer MCR100 (Paar-Physica) according to DIN EN ISO 3219, 25 1/s; 23° C.

The weight average molecular weight (Mw) was determined by conventional gel permeation chromatography (GPC) with Polystyrene standards EasyCal from Polymer Laboratories (Molecular Weight range: 200-400.000 g/mol). The sample was dissolved (1.0% wt./wt.) in tetrahydrofuran (THF) containing 0.5% toluene as Flow rate marker. Analysis were performed by liquid chromatography (Merck-Hitachi L7100) equipped with 3 PLGel Mixed-D LS polystyrene divinylbenzene GPC columns (300×7.5 mm×5 μm). The components of the sample were separated by the GPC columns based on their molecular size in solution and detected by a Refractive Index detector. Data were gathered and processed by Polymer Laboratories Cirrus GPC software. Average molecular weights and differential molecular weight distribution given in the results are calculated according to formulas which are well known state of the art (cf. DIN 55672-1).

Glass transition temperature (Tg) is measured by dynamic scanning calorimetry (DSC) according to ASTM E1356-08 with a heating gradient of 10 degrees Celsius per minute.

Example 1: Preparation of the Water-Insoluble (Meth)Acrylic Polymer (AP) Comprising Pendant Hydroxyl Groups The types and amounts of reagents used to prepare Compounds $AP_a$ to $AP_d$ are summarized in Table 1.

Butyl acetate (initial charge) was charged into a 2000 mL three neck round glass reactor. The reactor was purged with nitrogen and heated to 120° C. The mixture of monomers as mentioned in table 1 and solution of initiator (TAPEH) in butyl acetate were continuously fed to the reaction mixture over a period of 4 hours at 140° C. under vigorous stirring. A monomer chasing step of one hour at reaction temperature is conducted by additional addition of initiator in order to achieve full conversion of monomers. Then the reaction temperature was kept at 125° C. for additional 2 hours to decompose the majority of the unreacted thermal initiator.

TABLE 1

|  | $AP_a$ | $AP_b$ | $AP_c$ | $AP_d$ |
| --- | --- | --- | --- | --- |
| HPMA | 378 | 378 | 346.56 | 420 |
| Sty | 90 |  | 90 |  |
| BuA | 120 |  |  |  |
| BuMA |  | 222 |  | 180 |
| cardura EP 10 |  |  | 60 |  |
| AA |  |  | 25.44 |  |
| EA |  |  | 78 |  |
| TAPEH parallel | 18 | 18 | 18 | 18 |
| TAPEH monomer chasing | 3 | 3 | 3 | 3 |
| butyl acetate initial charge | 180 | 120 | 180 | 120 |
| butyl acetate parallel | 24 | 24 | 24 | 24 |
| butyl acetate monomer chasing | 12 | 12 | 12 | 12 |
| butyl acetate post dilution | 42 | 444 | 384 | 444 |
| viscosity 25° C. (mPas) | 979 | 5313 | 2307 | 13570 |
| Solid content (wt %) | 48.5 | 50.02 | 53.3 | 51.3 |
| Tg before acrylation (° C.) | 49 | 60 | 45 | 63 |
| I OH (mg/g KOH)-theoretical | 236 | 236 | 240 | 261 |
| Mw before acrylation | 18000 | 17800 | 14000 | 15000 |

Example 2: Preparation of the Radiation Curable Compositions (X) Comprising (Meth)Acrylated Acrylic Polymers (AA) Comprising Pendant Hydroxyl Groups The types and amounts of reagents used to prepare compositions X1 to X5 are summarized in Table 2.

Isophorone diisocyanate was charged into a 1000 L reactor with bismuth neodecanoate, butylated hydroxytoluene and butyl acetate under air sparging.

Reactor was heated to 60° C. PETIA was added drop wise in 2 hours, reaction was performed at a temperature not exceeding 65° C. until a specific isocyanate group content is achieved. Then diluted acrylic intermediate AP was added to the reaction mixture with additional bismuth neodecanoate, butylated hydroxytoluene and butyl acetate and was heated to 85° C. Maturation was done at 85° C. resulting in a specific isocyanate group content of not more than 0.015 meq/g.

TABLE 2

|  | X1 | X2 | X3 | X4 | X5 |
| --- | --- | --- | --- | --- | --- |
| IPDI | 53.06 | 53.06 | 40 | 40 | 30 |
| PETIA | 173.5 | 173.45 | 122.04 | 122.04 | 87.61 |
| BHT | 0.57 | 0.57 | 0.32 | 0.36 | 0.24 |
| Bismuth neodecanoate | 0.28 | 0.28 | 0.16 | 0.18 | 0.12 |
| butyl acetate | 84.94 | 84.94 | 48.61 | 54.01 | 32.28 |
| water-insoluble (meth)acrylic polymer (AP) comprising pendant hydroxyl groups | $AP_a$ | $AP_b$ | $AP_c$ | $AP_d$ | $AP_d$ |
| (AP) amounts | 431.17 | 679.26 | 304.02 | 383.52 | 229.25 |
| butyl acetate | 367.72 | 119.63 | 120.78 | 185.47 | 79.06 |
| Bismuth neodecanoate | 0.28 | 0.28 | 0.16 | 0.18 | 0.12 |
| stochio (NCO/OH)-worksheet | 1:0.75 | 1:0.75 | 1:0.7 | 1:0.7 | 1:0.67 |
| NCO/OH (molar) | 0.32 | 0.32 | 0.52 | 0.41 | 0.52 |
| % monoadduct | 40 | 40 | 50 | 45 | 50 |
| viscosity 25° C. (mPas) | 214 | 657 | 665 | 2800 | 1316 |
| I OH (mg/g KOH)-theoretical | 127 | 127 | 100 | 128 | 110 |
| Solid content (wt %) | 46.7 | 49.7 | 52.3 | 51.2 | 52.7 |
| Aging (10 days at 80° C.) | OK | OK | OK | OK | OK |
| Tg after acrylation (° C.) | 17 | 22 | 25 | 22 | 22 |
| Mw after acrylation (g/mol) | 14600 | 13200 | 34200 | 42580 | 27580 |

The amounts are in grams.

Example 3: Comparative Compositions Comprising Acrylic Polymers Comprising Hydroxyl Groups Both acrylic polymers comprising hydroxyl groups comprised in compositions Comp1 and Comp2 are not acrylated. In fact, there is no formation of a isocyanate group containing-monoadduct comprising at least one (meth)acrylate group able to graft methacrylate function in the backbone of the water-insoluble ethylenically unsaturated polymer comprising pendant hydroxyl groups.

The types and amounts of components used to prepare compositions Comp1 and Comp2 are summarized in Table 3.

TABLE 3

|  | Comp1 | Comp2 |
|---|---|---|
| PETIA | 173.5 | 173.5 |
| water-insoluble (meth)acrylic polymer (AP) comprising pendant hydroxyl groups | $AP_b$ | $AP_d$ |
| (AP) amounts | 431.7 | 679.3 |
| viscosity 25° C. (mPas) | 1840 | 396 |
| I OH (mg/g KOH) | 155 | 155 |
| Solid content (wt %) | 60.0 | 55.0 |

The amounts are in grams.

Example 4: Assessment of the Properties of Compositions X1 to X5 and Comparative Compositions Comp1 and Comp2

Pure Resin Evaluation

Compositions X1 to X5 and Comp1 to Comp2 were mixed with photoinitiator as described in table 4 (compositions X'1 to X'5 and Comp'1 to Comp'2). In addition, composition Comp0 comprising Neorad® A20 has been prepared and assessed as well. The solvent resistance, the tackiness, the film sticking after solvent evaporation, and the yellowing of the resulting coating have been measured according to the following methods.

Solvent Resistance (Acetone Double Rubs on PC):

a film of 25 μm is applied on a white non absorbing paper and solvent is evaporated 10 minutes in oven at 60° C. Coatings are then cured under UV lights at a cure speed of 10 m/min using a 120 Watt/cmHg lamps. Solvent resistance is assessed with acetone double rubs (ADR) by pressing a cotton rag saturated with acetone with a backward and forward motion on the coated surface; one double rub is equal to a backward and forward stroke on the coated surface. The reported number is the number of double rubs required to break through the coating. A high solvent resistance (more than hundred acetone double rubs) is necessary to ensure a good protection of the coating and the substrate against any household or industrial product spillage.

Tackiness and Film Sticking after Solvent Evaporation and Before Curing:

a film of 25 μm is applied on a white non absorbing paper. Solvent is evaporated 10 minutes in oven at 60° C. and tackiness is evaluated by a finger pressing on top of the film surface. The results are recorded in a 1-5 scale: 0=wet/1=very tacky/2=tacky/3=slightly tacky/4=dust free-finger print/5=tack free. A 5 score corresponds to a tack free film, when no visible marks appear on the surface. Scores of 4 or 5 are satisfying. In addition film stickiness is evaluated after two films are put on contact and separate from each other. The results are recorded in a 0-3 scale: 0=very strong stickiness/1=strong stickiness/2=slightly stickiness/3=no stickiness. Scores of 2-3 or 3 are satisfying.

Yellowing:

a film of 25 μm is applied on Lenetta paper, cured and exposed several times to the UV light. Yellowing (delta b) is measured with an apparatus type Supercolor immediately after short UV exposure (2 pass at 10 m/min) and longer UV exposure (5 pass at 10 m/min). The higher the delta b values the more coating yellow with UV exposure.

TABLE 4

|  | Comp0 | X'1 | Comp'1 | X'2 | Comp'2 | X'3 | X'4 | X'5 |
|---|---|---|---|---|---|---|---|---|
|  | Compositions | | | | | | | |
|  | Neorad ® A20 | X1 | Comp1 | X2 | Comp2 | X3 | X4 | X5 |
| Amount in grams | 100 | 100 | 100 | 100 | 100 | 100 | 100 | 100 |
| Additol ® CPK | 2.5 | 2.5 | 2.5 | 2.5 | 2.5 | 2.5 | 2.5 | 2.5 |
| Solvent resistance | | | | | | | | |
| 30 m/min | >100 | 80 | 40 | >100 | 60 | >100 | >100 | >100 |
| 40 m/min | >100 | 40-45 | 30 | 35-40 | 15 | >100 | >100 | >100 |
| 50 m/min | 75-80 | — | — | — | — | >100 | >100 | >100 |
| tack free/fingerprint - | 5 | 5 | 2 | 5 | 3 | 4 | 5 | 5 |
| film sticking | 3 | 2-3 | 0 | 3 | 1 | 2-3 | 2-3 | 2-3 |
| Yellowing: 2 × 10 m/min | 8.1 | 6.9 | 6.8 | 6.6 | — | 7.4 | 6.8 | 7.1 |
| Yellowing: 5 × 10 m/min | 8.9 | 7.4 | 7.3 | 7.1 | — | 7.9 | 7.3 | 7.7 |

The compositions X'1 to X'5 according to the invention provide an improvement in tackiness and stickiness level compared to the comparative compositions Comp'1 and Comp'2 comprising non acrylated compounds. The compositions X'1 to X'5 according to the invention provide an improvement in solvent resistance and reactivity compared to the comparative compositions Comp'1 and Comp'2 comprising non acrylated compounds. In particular, the compositions according to the invention X'3, X'4 and X'5 show a similar level of performance (tackiness, solvent resistance, reactivity) compared to composition Comp0 comprising Neorad® A 20 (GMA route). The coating compositions X'1 to X'5 according to the invention exhibit lower yellowing on cure compared to Neorad® A 20.

Example 5: Preparation of the Radiation Curable Compositions (Y)—2K Compositions Radiation curable compositions Y1 to Y3 according to the invention and comparative radiation curable composition Comp3 has been prepared by using the amounts and the type of compounds as summarized in table 5.

TABLE 5

|  | Composition | Comp3 | Y1 | Y2 | Y3 |
|---|---|---|---|---|---|
| Amounts in grams |  | Neorad ® A20 | X3 | X4 | X5 |
| Component I |  | 80.0 | 76.5 | 78.1 | 75.9 |
|  | Butylacetate | 5.0 | 4.75 | 17.5 | 6.5 |
|  | Modaflow ® 9200 | 0.7 | 0.7 | 0.7 | 0.7 |
|  | Additol ® CPK | 3.0 | 3.0 | 3.0 | 3.0 |
| Component II | Desmodur ® N3300/ BAC (90/10) | 24.09 | 16.05 | 20.55 | 17.67 |
| Component III | DBTL/BAC (1/100) | 2 | 2 | 2 | 2 |
| NCO/OH (molar) |  | 1.05 | 1.05 | 1.05 | 1.05 |

Example 6: Assessment of the Properties of Radiation Curable Compositions Y1 to Y3 and Comp3

Films have been prepared with the radiation curable compositions Y1 to Y3 and Comp3. 25 μm thick coating layers were applied on substrates using a bar coater. Coatings were then cured 2 times under UV lights at a cure speed of 10 m/min using a 120 Watt/cm² Hg lamps. Film conditioning is then performed 2 days in oven at 60° C. Substrates used are PC, ABS, ABS/PC. All the films obtained show nice, clear aspect without defects, before and after the oven and after UV curing.

The properties of the radiation curable compositions Y1 to Y3 and Comp3 have been assessed according to the following methods:

Film Appearance (Transparency):
the transparency of the coating is assessed on the difference aspect. The results are rated visually and recorded in a 1-5 scale: 5=fully transparent; 4=very slightly hazy; 3=slightly hazy; 2=hazy; 1=opaque. A high value (5) is expected to provide the best appearance and functionality of the coated object.

Scratch Resistance (Steel Wool on PC):
the test is performed by scratching the coating with the steel wool for 5 double rubs. The results are rated visually and recorded in a 1-5 scale: 5=no scratch; 4=very light scratch; 3=moderate scratch; 2=strong scratch; 1=very strong scratch. A high value (5) is expected to provide the best protection against any deterioration of the coated object.

Adhesion (Cross Hatch Tape):
The adhesion on ABS, PC and ABS/PC is assessed using the cross-cut test according to ISO 2409. 5 cuts of ~1 cm long and spaced by ~1 mm are made in the coating using a knife, followed by 5 similar cuts in the transversal direction. The adhesion was measured using an adhesive tape (Scotch®) firmly pressed on the cross-cut coating and removed rapidly; the damage to the cross-cut surface area of the coating due to adhesion loss is expressed in a 0-5 scale, 5=best. A high adhesion is necessary to ensure a strong permanent bond between the coating and the substrate.

Abrasion (Taber Haze):
coating's resistance to abrasion is assessed with taber haze according to ASTM D1044. Initial coating haze on PC is measured. The test specimen is then placed on the abrasion tester. A 500 gram load is placed on top of abrader wheel CS-10F and allowed to spin for a specified number of revolutions. A final haze measurement is taken and is compared to initial value. Abrasive damage is visually judged and numerically quantified by the difference in haze percentage in accordance with Test Method D1003 between an abraded and unabraded specimen. The lower the percent haze difference, the more resistant the coating is to abrasive damage.

Hydrolysis Resistance:
coating's resistance to hydrolysis is evaluated according to VW TL 226. The coating applied on a plastic substrate is place into a humidity chamber for 72 h, at 90° C., 95% relative humidity. Coating is evaluated on visual damage, gloss and cross hatch adhesion after humidity test. Test is passed when coating is not damaged and when same level of gloss and adhesion is achieved before and after the test.

Hand Cream and Sun Lotion Resistance:
coating's resistance and cream and sun lotion is evaluated according to VW PV 3964. Sun cream and hand lotion are applied on a bandage and laid on the coating. Sample is placed in a ventilated oven for 24 hours at 80° C., the bandage is removed and the remnant of cream/lotion is wiped off with a tissue. The sample is left at least 4 hours at room temperature before evaluation. Coating is evaluated on visual damage, gloss, cross hatch adhesion and scratch (Erichsen pen 10 N) after test. Test is passed when coating is not damaged and when same level of gloss and adhesion is achieved before and after the test.

Gloss Measurements:
Throughout the invention and also here gloss measurements were done with a BYK Gardner micro TRI-gloss 20-60-85 gloss-meter in accordance with DIN EN ISO 2813.

Erichsen Pen (Scratch/Adhesion):
an Erichsen pen 318 with tip of 0.75 mm is used with a 10N load. The test is passed if no rupture of the coating is recorded. However, an indentation is allowed.

The results regarding the properties assessment of the radiation curable compositions Y1 to Y3 and Comp3 are summarized in table 6.

TABLE 6

| Compositions | | Comp3 | Y1 | Y2 | Y3 |
|---|---|---|---|---|---|
| Adhesion on plastics | | | | | |
| black ABS | Film appearance | OK | OK | OK | OK |
|  | Gloss 20/60° | 93/96 | 86/92 | 82/90 | 82/90 |
|  | Adhesion (cross hatch tape) | 5 | 5 | 5 | 5 |
| black ABS/PC | Film appearance | OK | OK | OK | OK |
|  | Gloss 20/60° | 92/97 | 87/92 | 85/91 | 85/92 |
|  | Adhesion(cross hatch tape) | 3 | 5 | 5 | 5 |
| PC sheet 250 | Film appearance | OK | OK | OK | OK |
|  | Adhesion(cross hatch tape) | 5 | 5 | 5 | 5 |
| Abrasion | | | | | |
| Scratch resistance (Steel wool 5 double rubs) | | 3 | 3 | 3 | 3 |

TABLE 6-continued

| | Compositions | Comp3 | Y1 | Y2 | Y3 |
|---|---|---|---|---|---|
| Abrasion (Taber haze) | 100 cycles | 8.7 | 9.3 | 8.4 | 8.2 |
| | 200 cycles | 11.9 | 11.8 | 11.0 | 10.8 |
| | 300 cycles | 14.4 | 14.5 | 13.0 | 12.9 |
| Hydrolysis resistance | | | | | |
| black ABS/PC | Gloss 20/60° | 92/96 | 87/92 | 86/91 | 87/92 |
| | Adhesion(cross hatch tape) | 3 | 5 | 5 | 5 |
| Hand cream resistance | | | | | |
| black ABS | Gloss 20/60° | 94/97 | 88/92 | 81/90 | 82/91 |
| | Adhesion(cross hatch tape) | 5 | 5 | 5 | 5 |
| | Erichsen pen 10N | OK | OK | OK | OK |
| Sun lotion resistance | | | | | |
| black ABS | Gloss 20/60° | 93/97 | 84/92 | 82/91 | 84/91 |
| | Adhesion(cross hatch tape) | 5 | 5 | 5 | 5 |
| | Erichsen pen 10N | OK | OK | OK | OK |

The compositions Y1 to Y3 according to the invention have outstanding adhesion to the different plastic substrates. The coating compositions Y1 to Y3 according to the invention allow obtaining a desirable balance of optimum performance properties (gloss/abrasion) and in particular similar level as composition Comp3 which comprises Neorad® A 20 (GMA route). The coating compositions Y1 to Y3 according to the invention are passing all challenging chemical resistance tests typically used in automotive interior namely: the hydrolysis, hand cream and sun lotion resistance.

The invention claimed is:

1. A radiation curable composition (X) comprising at least one (meth)acrylated acrylic polymer (AA) comprising pendant hydroxyl groups which is the reaction product of:
   a) at least one water-insoluble (meth)acrylic polymer (AP) comprising pendant hydroxyl groups which is the reaction product of:
      a1) at least one hydroxy functional ethylenically unsaturated monomer (AP1), and
      a2) at least one ethylenically unsaturated monomer (AP2) which is different from (AP1), and
   b) at least one isocyanate group-containing monoadduct (MA) comprising at least one (meth)acrylate group and which attaches to the water-insoluble (meth)acrylic polymer (AP) comprising pendant hydroxyl groups by a urethane linkage and which is the reaction product of:
      b1) at least one polyisocyanate (MA1), and
      b2) at least one hydroxy functional (meth)acrylate monomer (MA2),
   wherein the equivalent ratio of NCO groups to OH groups of the radiation curable composition (X) is from 1:0.5 to 1:10 and the glass transition temperature (Tg) of the radiation curable composition (X) after the acrylation is at least 10° C. and wherein the glass transition temperature (Tg) is measured by dynamic scanning calorimetry (DSC) according to the standard ASTM E1356-08,
   wherein the hydroxyl number IOH of the radiation curable composition (X) is comprised from 20 to 350 mgKOH/g,
      wherein the hydroxyl number IOH is measured by the following method:
         step 1—acetylation step: all hydroxyl functions are acetylated at 75° C. by acetic chloride;
         step 2—the excess of acetic chloride is hydrolysed by a solution of N-methyl-2-pyrrolidone (NMP) in water; and
         step 3—titration step: The formed acid functions are titrated with KOH 0.5 N solution,
   wherein the radiation curable composition (X) is water-insoluble, and
   wherein the radiation curable composition (X) is a non-aqueous composition.

2. The radiation curable composition (X) according to claim 1, wherein the weight average molecular weight (Mw) of the radiation curable composition (X) is from 5,000 Daltons to 200,000 Daltons and is measured according to the standard DIN 55672-1.

3. The radiation curable composition (X) according to claim 1, wherein the at least one hydroxy functional ethylenically unsaturated monomer (AP1) is a hydroxy functional (meth)acrylate monomer (AP 11) and/or a hydroxy functional allylic monomer (AP12).

4. The radiation curable composition (X) according to claim 1, wherein the at least one hydroxy functional ethylenically unsaturated monomer (AP1) comprises at least one secondary hydroxyl group.

5. The radiation curable composition (X) according to claim 1, wherein the at least one hydroxy functional ethylenically unsaturated monomer (AP1) is selected from the group consisting of hydroxy functional alkyl (meth)acrylates with from 1 to 12 carbon atoms in the alkyl chain, reaction products of an ethylenically unsaturated carboxylic acid with another compound bearing one epoxy functionality and any mixtures thereof.

6. The radiation curable composition (X) according to claim 1, wherein the at least one ethylenically unsaturated monomer (AP2) is selected from the group consisting of styrenic derivative monomers (AP21), monomers (AP22) which are esters of (meth)acrylic and crotonic acid with saturated linear or cyclic alcohols, functionalized monomers (AP23), acidic monomers (AP24) and any mixtures thereof.

7. The radiation curable composition (X) according to claim 1, wherein the at least one water-insoluble (meth)acrylic polymer (AP) comprising pendant hydroxyl groups has a glass transition temperature (Tg) of at least 20° C. and wherein the glass transition temperature (Tg) is measured by dynamic scanning calorimetry (DSC) according to the standard ASTM E1356-08.

8. The radiation curable composition (X) according to claim 1, wherein the hydroxyl number of the at least one water-insoluble (meth)acrylic polymer (AP) comprising pendant hydroxyl groups is from 50 mg KOH/g to 500 mg KOH/g, and wherein the hydroxyl number IOH is measured by the following method:
   step 1— acetylation step: all hydroxyl functions are acetylated at 75° C. by acetic chloride;
   step 2—the excess of acetic chloride is hydrolysed by a solution of N-methyl-2-pyrrolidone (NMP) in water; and
   step 3—titration step: the formed acid functions are titrated with KOH 0.5 N solution.

9. The radiation curable composition (X) according to claim 1, wherein the at least one hydroxy (meth)acrylate monomer (MA2) is a mono-hydroxy poly(meth)acrylate compound.

10. The radiation curable composition (X) according to claim 1, wherein the equivalent ratio of NCO groups to OH groups of the isocyanate group-containing monoadduct (MA) comprising at least one (meth)acrylate group is from 1:0.5 to 1:1.

11. A process for preparing the radiation curable composition (X) according to claim 1, comprising the following steps:

step 1: reacting the at least one hydroxy functional ethylenically unsaturated monomer (AP1) with the at least one ethylenically unsaturated monomer (AP2) which is different from (AP1) in order to obtain at least one water-insoluble (meth)acrylic polymer (AP) comprising pendant hydroxyl groups, step 2: conducting an urethanization step by admixing the resulting at least one water-insoluble (meth)acrylic polymer (AP) comprising pendant hydroxyl groups:

with at least one isocyanate group-containing monoadduct (MA) comprising at least one (meth)acrylate group, or with at least one polyisocyanate (MA1) and at least one hydroxy functional (meth)acrylate monomer (MA2), the isocyanate group-containing monoadduct (MA) comprising at least one (meth)acrylate group being formed in situ.

12. A radiation curable composition (Y) comprising:
at least one radiation curable composition (X) according to claim 1, and
at least one polyisocyanate compound (P1), wherein the equivalent ratio of the NCO groups to the OH groups of the radiation curable composition (Y) is from 0.7:1 to 1.15:1.

13. The radiation curable composition (X) according to claim 1, which is used in a conformal coating, composite, three dimensional (3D) application, thick pigmented system, or as an adhesion promoter.

14. A coating, an adhesive, an ink, a plastic foil or an overprint varnish prepared from a radiation curable composition (X) according to claim 1.

15. A method for coating a substrate with a radiation curable composition (X) according to claim 1 which comprises the steps of:

step 1: applying the radiation curable composition (X) or (Y) to at least one surface of a substrate and step 2: curing the radiation curable coating composition by submitting the coated substrate to the radiation and/or to the heat.

* * * * *